US010620668B2

(12) United States Patent
Park et al.

(10) Patent No.: US 10,620,668 B2
(45) Date of Patent: Apr. 14, 2020

(54) DISPLAY DEVICE

(71) Applicant: SAMSUNG DISPLAY CO., LTD., Yongin-si, Gyeonggi-do (KR)

(72) Inventors: Jae Chun Park, Seoul (KR); Chang Min Park, Gwangmyeong-si (KR); Sang Wol Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/368,489

(22) Filed: Mar. 28, 2019

(65) Prior Publication Data
US 2019/0346887 A1 Nov. 14, 2019

(30) Foreign Application Priority Data

May 11, 2018 (KR) .................. 10-2018-0054114

(51) Int. Cl.
*G06F 1/16* (2006.01)
*G06F 9/30* (2018.01)
*G09F 9/30* (2006.01)

(52) U.S. Cl.
CPC ............ *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| 8,804,349 | B2* | 8/2014 | Lee ..................... G06F 1/1641 |
| | | | 361/749 |
| 9,250,733 | B2* | 2/2016 | Lee ..................... H04M 1/02 |
| 9,348,369 | B2* | 5/2016 | Kee ..................... G06F 1/1616 |
| 9,470,404 | B2* | 10/2016 | Lee ..................... F21V 21/30 |
| 9,557,771 | B2* | 1/2017 | Park ..................... G06F 1/1641 |
| 9,600,035 | B2* | 3/2017 | Park ..................... G06F 1/1681 |
| 9,781,826 | B2* | 10/2017 | Jeong ..................... G09F 9/301 |
| 9,939,847 | B2* | 4/2018 | Kee ..................... G06F 1/1616 |
| 10,133,303 | B2* | 11/2018 | Park ..................... G06F 1/1681 |
| 10,215,332 | B2* | 2/2019 | Lee ..................... F16M 13/00 |
| 10,365,691 | B2* | 7/2019 | Bae ..................... G06F 1/1652 |
| 2014/0355181 | A1* | 12/2014 | Jung ..................... G06F 1/1652 |
| | | | 361/679.01 |
| 2016/0209970 | A1* | 7/2016 | Lee ..................... G06F 1/1652 |

(Continued)

FOREIGN PATENT DOCUMENTS

| KR | 10-2014-0148176 | 12/2014 |
| KR | 10-2017-0063344 | 6/2017 |
| KR | 10-2017-0137984 | 12/2017 |

*Primary Examiner* — Lisa Lea-Edmonds
(74) *Attorney, Agent, or Firm* — Lewis Roca Rothgerber Christie LLP

(57) ABSTRACT

A display device includes: a display panel including first and second regions and a middle region between the first and second regions; a first rigid plate overlapping with the first region of the display panel; a second rigid plate overlapping with the second region of the display panel; a first coupling layer arranged between the display panel and the first rigid plate to be coupled with the first rigid plate and the first region of the display panel; a second coupling layer arranged between the display panel and the second rigid plate to be coupled with the second rigid plate and the second region of the display panel; and a first leveler between the middle region of the display panel and the first rigid plate and attached to the first rigid plate.

20 Claims, 23 Drawing Sheets

240 : 241, 242
NAD3 : 251, 252

(56) References Cited

U.S. PATENT DOCUMENTS

| | | | |
|---|---|---|---|
| 2017/0371377 A1* | 12/2017 | Jung | G06F 1/1652 |
| 2018/0011576 A1 | 1/2018 | Ryu | |
| 2018/0203487 A1* | 7/2018 | Kee | G06F 1/1616 |
| 2018/0356860 A1* | 12/2018 | Jung | G06F 1/1652 |
| 2019/0025887 A1* | 1/2019 | Seo | G06F 1/1652 |

* cited by examiner

DISPLAY DEVICE

CROSS-REFERENCE TO RELATED APPLICATION

This application claims priority to and the benefit of Korean Patent Application No. 10-2018-0054114, filed on May 11, 2018 in the Korean Intellectual Property Office, the entire disclosure of which is incorporated herein by reference.

BACKGROUND

1. Field

Aspects of embodiments of the present disclosure relate to a display device.

2. Description of the Related Art

Display devices are for displaying images and include a display panel, such as an organic light-emitting display panel or a liquid-crystal display panel.

A mobile electronic device includes a display device for providing an image to a user. More and more mobile electronic devices have a larger display screen, even while having a same or smaller volume or thickness compared to existing display devices. Also, a foldable display device or a bendable display device having a structure that can be folded and unfolded to provide a large screen only when it is used is being developed.

SUMMARY

According to an aspect of embodiments of the present disclosure, a display device can prevent or substantially prevent deterioration of display quality caused when the display device is switched between a folded state and an unfolded state.

According to one or more embodiments of the present invention, a display device includes: a display panel comprising first and second regions and a middle region between the first and second regions; a first rigid plate overlapping with the first region of the display panel; a second rigid plate overlapping with the second region of the display panel; a first coupling layer arranged between the display panel and the first rigid plate to be coupled with the first rigid plate and the first region of the display panel; a second coupling layer arranged between the display panel and the second rigid plate to be coupled with the second rigid plate and the second region of the display panel; and a first leveler between the middle region of the display panel and the first rigid plate and attached to the first rigid plate.

The display device may further include a second leveler between the middle region of the display panel and the second rigid plate and attached to the second rigid plate. The first leveler and the second leveler may be spaced apart from the display panel when the middle region of the display panel is bent.

Each of the first and second levelers may include a first concave portion and a first convex portion on an inner side surface therebetween, a first width from a reference plane to the first concave portion may be larger than a second width from the reference plane to the first convex portion, and the reference plane may separate the first and second rigid plates from each other.

The first convex portion of the first leveler may be arranged corresponding to the first concave portion of the second leveler, and a distance between the first leveler and the second leveler may be uniform throughout the entire inner side surface of the first leveler.

Each of the first and second rigid plates may include a second concave portion and a second convex portion on an inner side surface therebetween, and the second convex portion of the first rigid plate may completely overlap with the first convex portion of the first leveler.

The first convex portion may have a shape different from a shape of the first concave portion, and an edge of the first convex portion may be rounded.

The first convex portion of the first leveler may be arranged corresponding to the first convex portion of the second leveler, a distance from the first convex portion of the first leveler to the first convex portion of the second leveler may be less than an average distance between the first and second levelers, and a space between the first and second levelers may be discontinuous with respect to the reference plane.

The display device may further include: a third leveler arranged between the middle region of the display panel and the first leveler to be coupled with the middle region of the display panel; and a fourth leveler arranged between the middle region of the display panel and the second leveler to be coupled with the middle region of the display panel. The third leveler may be spaced apart from the first leveler when the middle region of the display panel is bent, and a sum of a thickness of the first leveler and a thickness of the third leveler may be equal to a thickness of the first coupling layer.

A thickness of the third leveler may be less than a thickness of the first leveler, one of the first and third levelers may include a single-sided adhesive film, and the other one of the first and third levelers may include an anti-fouling coating layer.

An average thickness of the first leveler may be less than a thickness of the first coupling layer, and a thickness of a portion of the first leveler may be greater than a thickness of another portion of the first leveler.

A thickness at a center of the first leveler may be greater than a thickness at an edge of the first leveler.

A thickness of the first leveler may become smaller toward the first coupling layer and may become larger toward the second leveler.

The first leveler may include convex portions protruding toward the display panel, and a width of each of the convex portions may become smaller toward the first coupling layer and may become larger toward the second leveler.

The first leveler may include convex portions protruding toward the display panel, and a distance between the convex portions may become smaller toward the first coupling layer and may become larger toward the second leveler.

A thickness of the first leveler may become larger toward the first coupling layer and may become smaller toward the second leveler.

The first leveler may include a plurality of protrusions protruding toward the display panel, and the protrusions may have a same thickness.

The protrusions may be arranged in a lattice when viewed from a top.

The second rigid plate may not overlap with the middle region of the display panel.

According to one or more embodiments of the present invention, a display device includes: a display panel including first and second regions and a middle region between the first and second regions; a first rigid plate overlapping with the first region of the display panel; a second rigid plate overlapping with the second region of the display panel; a first coupling layer arranged between the display panel and the first rigid plate to be coupled with the first rigid plate and the first region of the display panel; a second coupling layer arranged between the display panel and the second rigid plate to be coupled with the second rigid plate and the second region of the display panel; and a first leveler between the middle region of the display panel and the first rigid plate and attached to the display panel.

The display device may further include a second leveler between the middle region of the display panel and the first rigid plate and attached to the display panel.

According to one or more embodiments of the present disclosure, a metal plate is arranged on a lower surface (or a back surface) opposite to the display surface of a display panel of a foldable display device, such that non-foldable regions can be maintained flat or substantially flat. In addition, a leveler is arranged between the display panel and metal plates in a foldable region that is bent relatively largely by an external force, such that the deformation of the display panel is suppressed, and the entire display panel (i.e. the foldable region and non-foldable regions) can have uniform characteristics for external light, reflection light, etc. As a result, it is possible to prevent or substantially prevent deterioration of the display quality.

It is noted that effects of the present disclosure are not limited to those described above and other effects of the present disclosure will be apparent to those skilled in the art from the following description.

BRIEF DESCRIPTION OF THE DRAWINGS

The above and other aspects and features of the present disclosure will become more apparent by describing in further detail some exemplary embodiments thereof with reference to the attached drawings, in which.

DETAILED DESCRIPTION

Figure 1:
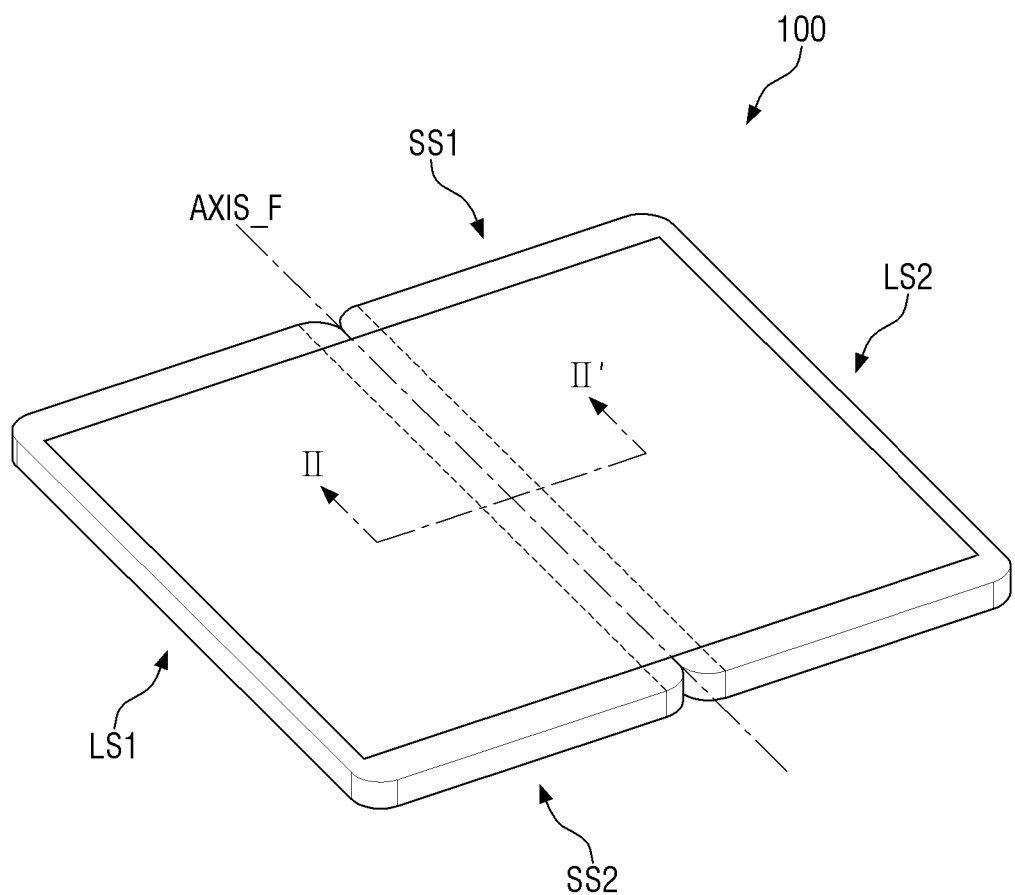
FIG. 1 is a perspective view of a display device according to an exemplary embodiment of the present disclosure.

Aspects and features of the present invention and methods for achieving the aspects and features will be apparent by referring to some embodiments to be described in further detail with reference to the accompanying drawings. However, the invention is not limited to the embodiments disclosed herein, but may be implemented in diverse forms. The matter defined in the description, such as the detailed construction and elements, are provided to assist those of ordinary skill in the art in a comprehensive understanding of the invention, and the invention is defined within the scope of the appended claims.

Where an element is described as being related to another element, such as being "on" another element or "located on" a different layer or a layer, this includes both a case in which an element is located directly on another element or a layer and a case in which an element is located on another element via another layer or still another element. In contrast, where an element is described as being is related to another element such as being "directly on" another element or "located directly on" a different layer or a layer, this indicates a case in which an element is located on another element or a layer with no intervening element or layer therebetween. Throughout the description of the present invention, same drawing reference numerals are used for same elements across various figures.

Although the terms "first," "second," and so forth are used to describe diverse constituent elements, such constituent elements are not limited by the terms. The terms are used to distinguish a constituent element from other constituent elements. Accordingly, in the following description, a "first" constituent element may be a "second" constituent element.

The terminology used herein is for the purpose of describing particular embodiments and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It is to be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the drawings. It is to be understood that relative terms are intended to encompass different orientations of the device in addition to the orientation depicted in the drawings. For example, if a device in one of the figures is turned over, elements described as being on the "lower" side of other elements would then be oriented on "upper" sides of the other elements. The exemplary term "lower" can, therefore, encompass both an orientation of "lower" and "upper," depending on the particular orientation of the drawing. Similarly, if a device in one of the figures is turned over, elements described as "below" or "beneath" other elements would then be oriented "above" the other elements. The exemplary terms "below" or "beneath" can, therefore, encompass both an orientation of above and below.

Throughout the specification, same reference numerals are used for same or similar elements.

Herein, some exemplary embodiments of the present disclosure will be described with reference to the accompanying drawings.

Figure 2:
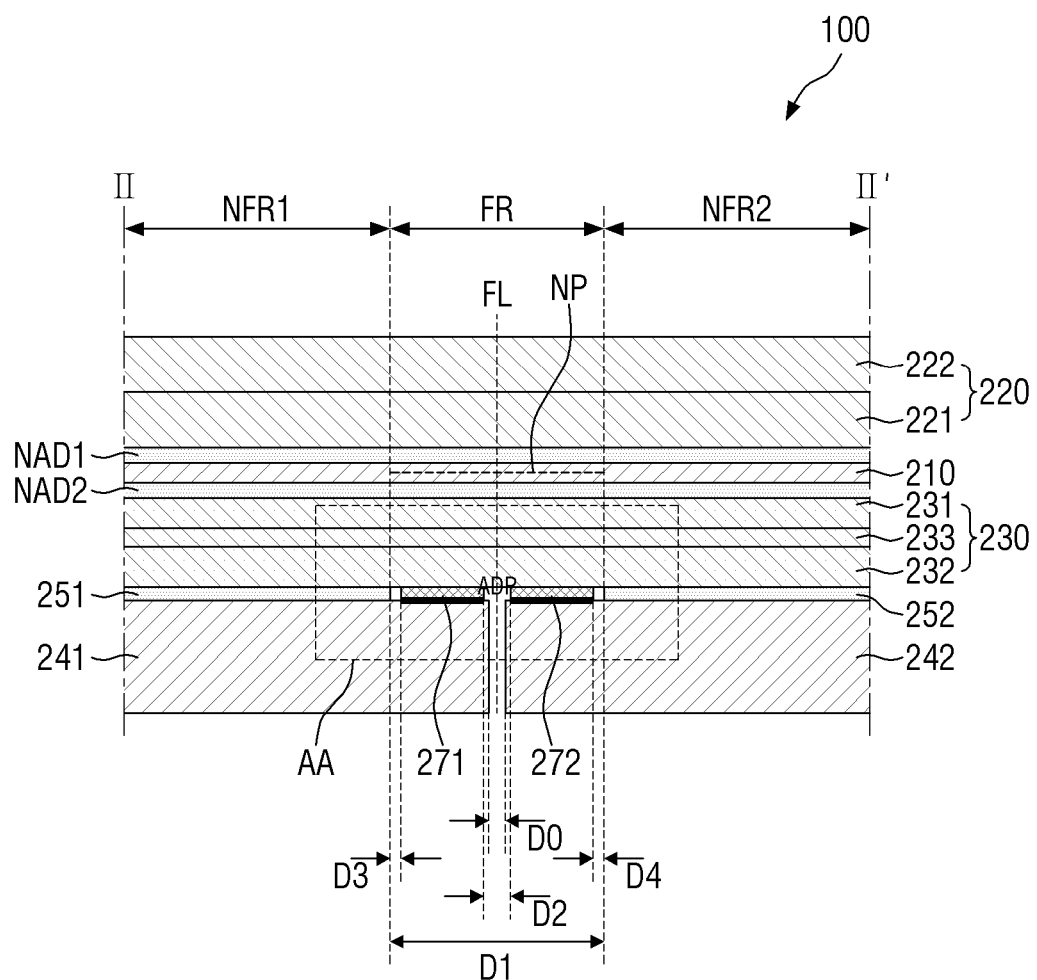
FIG. 2 is a cross-sectional view taken along the line II-II' of FIG. 1.
Figure 3:
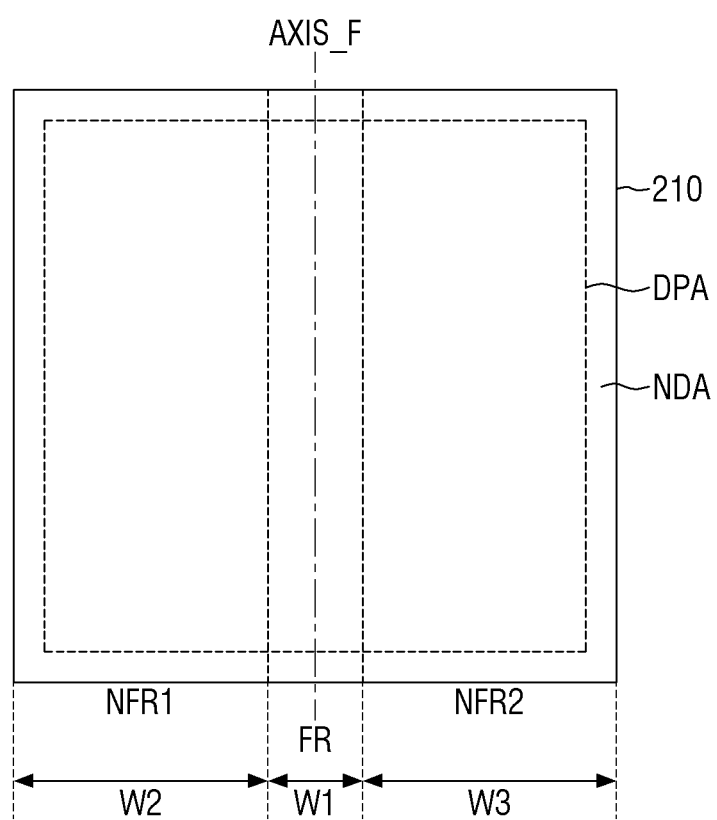
FIG. 3 is a plan view of a display device according to an exemplary embodiment of the present disclosure.
Figure 4:
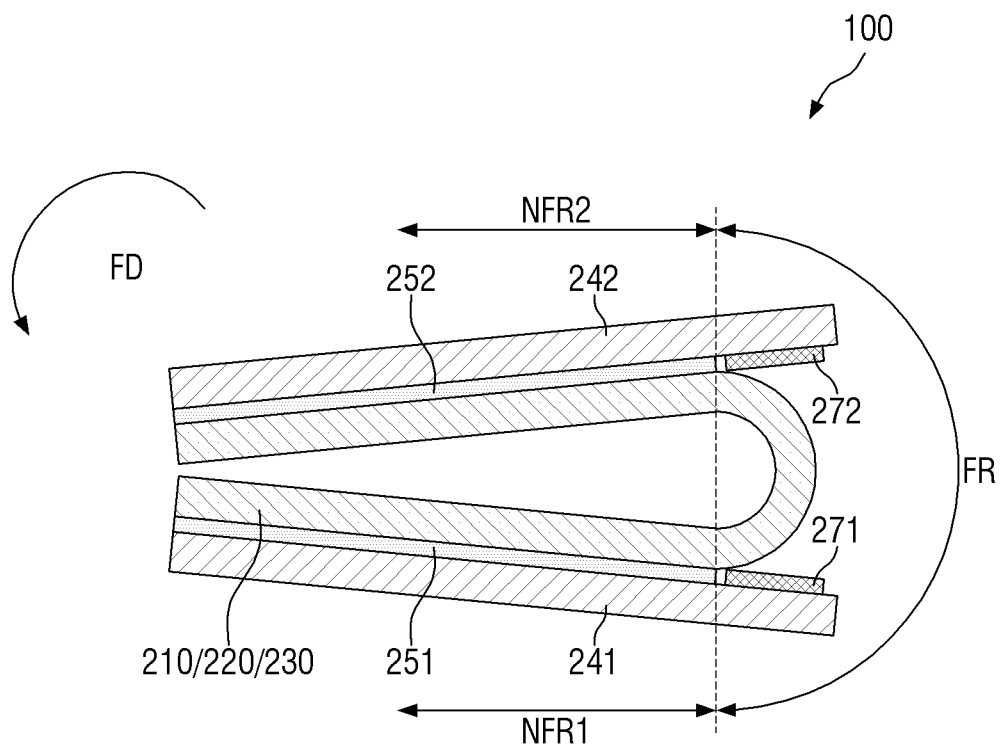
FIG. 4 is a cross-sectional view showing a display device according to an exemplary embodiment of the present disclosure, shown in a folded state.

FIG. 1 is a perspective view of a display device according to an exemplary embodiment of the present disclosure; FIG. 2 is a cross-sectional view taken along the line II-II' of FIG. 1; FIG. 3 is a plan view of a display device according to an exemplary embodiment of the present disclosure; and FIG. 4 is a cross-sectional view showing a display device according to an exemplary embodiment of the present disclosure, shown in a folded state.

Referring to FIGS. 1 to 4, in an embodiment, a display device 100 may have a substantially rectangular shape when viewed from the top. The display device 100 may be rectangular having corners having a right angle or rounded corners when viewed from the top. The display device 100 may include four sides or edges. The display device 100 may include longer sides LS1 and LS2 and shorter sides SS1 and SS2.

As used herein, "top" and "upper surface" in the thickness direction refer to the side of the display panel in which images are displayed in the unfolded state, whereas "bottom" and "lower surface" refer to the opposite side of the display panel in the unfolded state, unless stated otherwise. In addition, "upper side," "lower side," "left side," and "right side" in the plane are defined when the display surface is viewed from the top.

In describing the rectangular display device 100 or a display panel or the like included therein, the longer side located on the left side in the plan view is referred to as a first longer side LS1, and the longer side located on the right side is referred to as a second longer side LS2, the shorter side located on the upper side is referred to as a first shorter side SS1, and the shorter side located on the lower side is referred to as a second shorter side SS2. The length of each of the longer sides LS1 and LS2 of the display device 100 may be, but is not limited to being, in a range of 1.2 to 2.5 times the length of the shorter sides SS1 and SS2.

The display device 100 can be bent with respect to a folding axis AXIS_F crossing the first shorter side SS1 and the second shorter side SS2. That is, the display device 100 may be switchable between a folded state in which it is folded with respect to the folding axis AXIS_F and an unfolded state.

In an embodiment, a groove (e.g., a notch) recessed toward the center of gravity on the plane is formed at the intersection of the folding axis AXIS_F and each of the first shorter side SS1 and the second shorter side SS2 of the display device 100. A hinge member (not shown) for switching between the states may be coupled to the groove, for example. It is noted that the switching between the folded state and the unfolded state of the display device 100 will be described later with reference to FIG. 4 after the elements included in the display device 100 are described.

The display device 100 may include a display panel 210 (or display module), an upper flexible module 220, a lower flexible module 230, and a rigid layer 240. In addition, the display device 100 may include a plurality of adhesive layers NAD1, NAD2, and NAD3 each disposed between two of the display panel 210, the upper flexible module 220, the lower flexible module 230, and the rigid layer 240.

The display panel 210 may display an image by receiving data signals. The display panel 210 may be one of an organic light-emitting display panel, a liquid-crystal display panel, a plasma display panel, an electrophoretic display panel, an electrowetting display panel, a quantum-dot emission display panel, and a micro LED, for example. In the illustrated exemplary embodiment, an organic light-emitting display panel is employed as the display panel 210.

The display panel 210 may include a flexible substrate including a flexible polymer material, such as polyimide. Accordingly, the display panel 210 may be curved, bent, folded, or rolled.

The display panel 210 may have a shape substantially similar to that of the display device 100 when viewed from the top. It is, however, to be understood that the shape of the display panel 210 is not limited thereto. At least one side (e.g., the first longer side LS1) of the display panel 210 may be curved or bent at a right angle. A circuit board (not shown) including wires for transmitting signals necessary for driving the display panel 210 may be connected through at least one side of the display panel 210. The circuit board may be disposed such that it overlaps with the display panel 210 in a thickness direction of the display panel 210.

The display panel 210 may include a display area DPA where images are displayed, and a non-display area NDA where no image is displayed.

The display area DPA may be disposed at a center of the display panel 210. The display area DPA may include pixels. Each of the pixels may include an emissive layer and a circuit layer for controlling the amount of light emitted from the emissive layer. The circuit layer may include a display wiring, a display electrode, and at least one transistor. The emissive layer may include an organic light-emitting material. The emissive layer may be sealed by an encapsulation layer. The encapsulation layer can seal the emissive layer to prevent or substantially prevent moisture and the like from being introduced from the outside. The encapsulation layer may be made up of a single inorganic layer or multiple layers thereof, or a stack of inorganic layers and organic layers alternately stacked on one another.

Similar to the display device 100, the display area DPA may have a rectangular shape or a rectangular shape with rounded corners. It is, however, to be understood that the present disclosure is not limited thereto. The display area DPA may have any of various shapes, such as a square or other polygonal or circular shape, elliptical shape, etc.

The non-display area NDA may be located around the display area DPA. The portion of the display panel 210 other than the display area DPA may be the non-display area NDA. The non-display area NDA may refer to an area from the outer boundary of the display area DPA to the edge of the display panel 210. In the non-display area NDA, signal wiring for applying a signal to the display area DPA or drive circuits may be disposed. In addition, the outermost part of a black matrix may be disposed in the non-display area NDA.

When the display device 100 is a foldable display device (or a bendable display device), the display panel 210 may include a foldable region (or bendable region) FR. The foldable region FR will be described later together with the rigid layer 240.

The upper flexible module 220 may overlap with the display panel 210 in the thickness direction and may be disposed above the display panel 210. The upper flexible module 220 may be used to adjust the position of a neutral plane NP of the display device 100 together with the lower flexible module 230. When the display device 100 is bent or folded, a tensile stress occurs on one side of the neutral plane NP while a compressive stress occurs on the other side. Between the sides, there is a plane that is neither expanded nor contracted, which is defined as the neutral plane NP. There is no bending stress on the neutral plane NP. For example, the upper flexible module 220 (or the upper flexible module 220 and the first adhesive layer NAD1) and the lower flexible module 230 (or the lower flexible module 230 and the second adhesive layer NAD2) may place the neutral plane NP of the display device 100 in the display panel 210 (e.g., a layer on which the transistors of the display panel 210 are formed).

In an embodiment, the upper flexible module 220 may include an optical film 221 and a window 222. The optical film 221 may include a polarizing film, a microlens, a prism film, or the like. The optical film 221 may have substantially the same shape as the display panel 210 (or the display area DPA of the display panel 210). In an embodiment, the optical film 221 may be omitted.

The window 222 may be disposed on the optical film 221. The window 222 covers and protects the display panel 210. The window 222 may be made of a transparent material. The window 222 may include, for example, glass or a plastic. When the window 222 includes a plastic, the window 222 may be flexible.

Examples of plastics applicable to the window 222 may include, but are not limited to, polyimide, polyacrylate, polymethyl methacrylate (PMMA), polycarbonate (PC), polyethylene naphthalate (PEN), polyvinylidene chloride, polyvinylidene difluoride (PVDF), polystyrene, ethylene vinyl alcohol copolymer, polyether sulfone (PES), polyetherimide (PEI), polyphenylene sulfide (PPS), polyallylate, tri-acetyl cellulose (TAC), cellulose acetate propionate (CAP), and the like. In an embodiment, the window 222 may include one or more of the plastic materials listed above.

The first adhesive layer NAD1 may be disposed between the upper flexible module 220 and the display panel 210. The upper flexible module 220 may be attached to an upper surface of the display panel 210 by the first adhesive layer NAD1. For example, the first adhesive layer NAD1 may be an optical clear adhesive (OCA).

The lower flexible module 230 may overlap with the display panel 210 in the thickness direction and may be disposed below the display panel 210.

In an embodiment, the lower flexible module 230 may include at least one functional layer. The functional layer may perform a heat dissipation function, an electromagnetic wave shielding function, a grounding function, a buffering function, a strength enhancing function, a supporting function, a bonding function, a pressure sensing function, a digitizing function. The functional layer may be a sheet layer made of a sheet, a film layer made of a film, a thin film layer, a coating layer, a panel, a plate, or the like. A single functional layer may be made up of a single layer or a plurality of thin films or coating layers stacked on one another. The functional layer may be, for example, a supporting substrate, a heat-radiating layer, an electromagnetic wave shielding layer, an impact absorbing layer, a coupling layer, a pressure sensor, a digitizer, etc.

In an embodiment, the lower flexible module 230 may have a light transmittance lower than the upper flexible module 220. That is, the upper flexible module 220 may have a relatively high light transmittance and may transmit light (or an image) emitted from the display area of the display panel 210 toward the top. The lower flexible module 230 may have a relatively low light transmittance and may block light that is emitted from the display area of the display panel 210 downward and reflected.

The second adhesive layer NAD2 may be disposed between the lower flexible module 230 and the display panel 210. The lower flexible module 230 may be attached to a lower surface of the display panel 210 by the second adhesive layer NAD2.

In an embodiment, the lower flexible module 230 may include a substrate 231, an adhesive film 233, and an impact absorbing layer 232.

The substrate 231 may be disposed under the display panel 210 and may be coupled to the display panel 210 by the second adhesive layer NAD2. In an embodiment, the second adhesive layer NAD2 may include a pressure-sensitive adhesive (PSA). The second adhesive layer NAD2 may be provided in the form of either a single-sided tape or a double-sided tape.

The substrate 231 may be made of, for example, a material including polyethylene terephthalate (PET), polyimide (PI), polycarbonate (PC), polyethylene (PE), polypropylene (PP), polysulfone (PSF), polymethyl methacrylate (PMMA), triacetylcellulose (TAC), cycloolefin polymer (COP), etc. In an embodiment, the substrate 231 may be a patterned film.

The impact absorbing layer 232 may be disposed under the substrate 231 and may be bonded to the substrate 231 by the adhesive film 233. The impact absorbing layer 232 may prevent or substantially prevent an impact from the outside (for example, from the bottom) from being transmitted to the display panel 210. For example, the impact absorbing layer 232 may be made of a material including polyurethane (PU), thermoplastic polyurethane (TPU), silicon (Si), polydimethylacrylamide (PDMA), etc.

The rigid layer 240 may overlap with the lower flexible module 230 in the thickness direction and may be disposed below the lower flexible module 230.

In an embodiment, the rigid layer 240 may be made of a material including a metal material, such as stainless steel (SUS) and aluminum, or a polymer material, such as polymethyl methacrylate (PMMA), polycarbonate (PC), polyvinyl alcohol (PVA), acrylonitrile butadiene styrene (ABS) and polyethylene terephthalate (PET). The rigid layer 240 may prevent or substantially prevent the display panel 210 from being bent by an external force or may mitigate or reduce the degree of bending (e.g., bending angle, bending radius of curvature) of the display panel 210. That is, the rigid layer 240 can maintain the display panel 210 in a relatively flat state, even if an external force is applied.

The third adhesive layer NAD3 may be disposed between the rigid layer 240 and the lower flexible module 230. The rigid layer 240 may be attached to the lower flexible module 230 by the third adhesive layer NAD3.

A protrusion (not shown) or a groove (or hole) (not shown) may be formed in the lower surface of the rigid layer 240 such that a housing (not shown) may be coupled to the display device 100 by the protrusion or groove.

The rigid layer 240 may include a first rigid plate 241 and a second rigid plate 242 that are separated from each other to the left and right (or in the horizontal direction). The first rigid plate 241 and the second rigid plate 242 may be disposed on the same plane and spaced apart from each other by a reference distance D0 in the horizontal direction. In an embodiment, for example, the reference distance D0 may be 0.1 mm or less. In an embodiment, the first and second rigid plates 241 and 242 are, but not limited to being, mutually symmetric with respect to a folding line FL (i.e. a line meeting the folding axis AXIS_F in the thickness direction).

In an embodiment, for example, the first and second rigid plates 241 and 242 may be mutually asymmetric with respect to the folding line FL.

Although the first rigid plate 241 and the second rigid plate 242 are depicted as being spaced apart from each other in FIG. 2, this is merely illustrative to emphasize that the first rigid plate 241 and the second rigid plate 242 are separated from each other (or mutually discontinuous). In an embodiment, for example, the first rigid plate 241 and the second rigid plate 242 may be in contact with each other.

The third adhesive layer NAD3 (or a third coupling layer) may be disposed between the first and second rigid plates 241 and 242 (or the rigid layer 240) and the lower flexible module 230, such that the first and second rigid plates 241 and 242 may be coupled to the lower portion of the lower flexible module 230 by the third adhesive layer NAD3.

The third adhesive layer NAD3 may include a first coupling film 251 (or a first coupling layer or a first adhesive film) and a second coupling film 252 (or a second coupling layer or a second adhesive film).

The first coupling film 251 overlaps with the display panel 210 (or the lower flexible module 230) in the thickness direction in a first non-foldable region NFR1 and may be disposed between the lower flexible module 230 and the first rigid plate 241. The first rigid plate 241 may be coupled to the lower flexible module 230 by the first coupling film 251. Similarly, the second coupling film 252 overlaps with the display panel 210 (or the lower flexible module 230) in the thickness direction in a second non-foldable region NFR2 and may be disposed between the lower flexible module 230 and the second rigid plate 242. The second rigid plate 242 may be coupled to the lower flexible module 230 by the second coupling film 252.

The first coupling film 251 and the second coupling film 252 may be located on the same plane and may be separated from each other by a first distance D1. The first distance D1 may be equal to or greater than the reference distance D0.

In an embodiment, an inner side surface of the first rigid plate 241 may be closer to the folding line FL (or the folding axis AXIS_F) than an inner side surface of the first coupling film 251, and an inner side surface of the second rigid plate 242 may be closer to the folding line FL than an inner side surface of the second coupling film 252.

In this case, the foldable region FR and the first and second non-foldable regions NFR1 and NFR2 of the display panel 210 (or the display device 100) may be set or defined by the first coupling film 251 and the second coupling film 252. The first and second non-foldable regions NFR1 and NFR2 refer to the areas where the first and second rigid plates 241 and 242 are coupled with the lower flexible module 230 by the first and second coupling films 251 and 252, respectively. The first and second non-foldable regions NFR1 and NFR2 may have a small degree of bending due to an external force and may have a generally flat state. That is, the first and second non-foldable regions NFR1 and NFR2 may be defined as areas where the rigid layer 240 (or the first and second rigid plates 241 and 242), the third adhesive layer NAD3, and the display panel 210 are all overlapped with one another in the thickness direction and coupled (or attached) with one another. The foldable region FR refers to an area which is not directly coupled with (or supported by) the first rigid plate 241 and the second rigid plate 242, and may have a large degree of bending due to an external force. For example, given the same external force, the degree of deformation (for example, the degree of bending) of the foldable region FR may be three times or more the degree of deformation of the first and second non-foldable regions NFR1 and NFR2. The foldable region FR may be switched from the folded state to the expanded state (or unfolded state) by an external force, or vice versa.

As shown in FIG. 3, in an embodiment, the foldable region FR has a rectangular shape and has a first width W1 in the horizontal direction with respect to the folding axis AXIS_F extending in the up-and-down direction (or vertical direction) and may extend vertically from the first shorter side surface SS1 to the second shorter side surface SS2. The first width W1 may be equal to or similar to the first distance D1 between the first and second coupling films 251 and 252.

The first non-foldable region NFR1 has a second width W2 and may be connected to one side of the foldable region FR (e.g., the left side of the folding axis AXIS_F). Similarly, the second non-foldable region NFR2 has a third width W3 and may be connected to an opposite side of the foldable region FR (e.g., the right side of the folding axis AXIS_F). The second width W2 of the first non-foldable region NFR1 may be equal to or different from the third width W3 of the second non-foldable region NFR2.

As shown in FIG. 4, when an external force is applied to a side (e.g., the right side) of the display device 100 upwardly (or along a folding direction FD), the folding region FR is bent or folded, such that the second non-foldable region NFR2 may overlap with or face the first non-foldable region NFR1 while moving or rotating along the folding direction FD. As described earlier, the first and second non-foldable regions NFR1 and NFR2 may also be bent, but the degree of deformation in the first and second non-foldable regions NFR1 and NFR2 (for example, the bending angle) may be ⅓ times or less the degree of deformation of the foldable region FR.

The display device 100 may further include a first leveler 271 (or a first height-compensating layer) and a second leveler 272 (or a second height-compensating layer).

The first leveler 271 and the second leveler 272 overlap the foldable region FR and may be disposed on the same plane as the first and second coupling films 251 and 252.

The first leveler 271 may be disposed between the lower flexible module 230 and the first rigid plate 241. Similarly, the second leveler 272 may be disposed between the lower flexible module 230 and the second rigid plate 242. The first leveler 271 and the second leveler 272 may be spaced apart from each other by a second distance D2 in the horizontal direction. The second distance D2 may be equal to or greater than the reference distance D0 and may be less than the first distance D1. The first leveler 271 may be spaced apart from the first coupling film 251 by a third distance D3, and the second leveler 272 may be spaced from the second coupling film 252 by a fourth distance D4. The third distance D3 may be equal to or different from the fourth distance D4. In an embodiment, for example, each of the third distance D3 and the fourth distance D4 may be 5 mm or less, 1 mm or less, or 0.1 mm or less. In an embodiment, the third distance D3 and the fourth spacing distance D4 may be substantially zero. That is, in an embodiment, the side surface of the first leveler 271 and the first coupling film 251 may be partially or entirely in contact with each other.

As shown in FIG. 2, the first leveler 271 may be attached on the first rigid plate 241 by an adhesive portion ADP. The adhesive portion ADP has an adhesive force (or a coupling force) and may be made of a separate adhesive film, an adhesive resin, etc. For example, the first leveler 271 may be a single-sided adhesive film having an adhesive lower surface. Similarly, the second leveler 272 may be attached on the second rigid plate 242 by the adhesive portion ADP.

For example, the second leveler 272 may be a single-sided adhesive film having an adhesive lower surface.

In this manner, the first and second rigid plates 241 and 242 support the display panel 210 (and the lower flexible module 230) by the levelers 271 and 272. Accordingly, it is possible to prevent or substantially prevent deformation of the display panel 210 during a fabricating process (and in use). For example, during a lamination process for attaching the first and second rigid plates 241 and 242 to the lower flexible module 230, the display panel 210 and the lower flexible module 230 may be pressed by a lamination roller in the foldable region FR such that they are deformed. As a result, it is possible to prevent or substantially prevent deterioration of the display quality.

A thickness of each of the first and second levelers 271 and 272 may be equal to or less than the thickness of the first and second coupling films 251 and 252 (or the third adhesive layer NAD3). In an embodiment, for example, the thickness of each of the first and second levelers 271 and 272 may be 50%, 80%, or 90% of the thickness of the first and second coupling films 251 and 252.

For example, even if the thickness of the first and second levelers 271 and 272 is less than the thickness of the first and second coupling films 251 and 252, respectively, the deformation of the display panel 210 during the lamination process can be prevented or substantially prevented by the width W1 and the restoring force of the display panel 210. In addition, it is possible to prevent or substantially prevent the first and second rigid plates 241 and 242 from pressing the display panel 210 at the lower portion of the foldable region FR due to an error in the unfolding range of the hinge member (not shown), a coupling error between the display panel 210 and the hinge member (for example, when the display panel 210 is unfolded at 181 degrees exceeding 180 degrees).

As described above, the display device 100 not only maintains the non-foldable regions NFR1 and NFR2 of the display panel 210 flat due to the first and second rigid plates 241 and 242, but also prevents or substantially prevents deformation of the foldable region FR by the levelers 271 and 272, thereby preventing or alleviating deterioration of the display quality.

Figure 5:
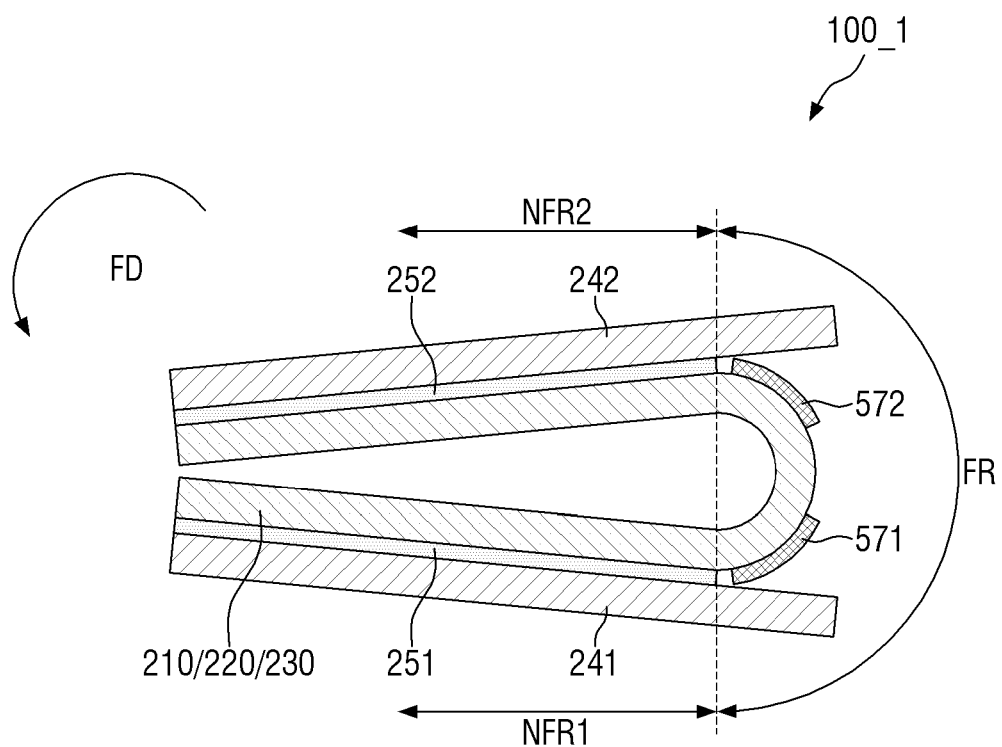
FIG. 5 is a cross-sectional view of a display device according to another exemplary embodiment of the present disclosure, shown in a folded state.

FIG. 5 is a cross-sectional view of a display device according to another exemplary embodiment of the present disclosure.

Referring to FIG. 5, a display device 100_1 is different from the display device 100 of FIG. 2 in that the display device 100_1 includes first and second levelers 571 and 572.

The first and second levelers 571 and 572 may be similar to the first and second levelers 271 and 272 described above with reference to FIGS. 2 and 4, respectively. It is noted that the first leveler 571 may be attached under the lower flexible module 230 by an adhesive portion ADP thereon in FIG. 2. Similarly, the second leveler 571 may be attached under the lower flexible module 230 by the adhesive portion ADP thereon. That is, the first and second levelers 571 and 572 may be single-sided adhesive films having an adhesive upper surface.

The first and second levelers 571 and 572 may have flexibility like the lower flexible module 230. For example, the first and second levelers 571 and 572 may include a material forming the impact absorbing layer 232.

Since the first and second levelers 571 and 572 are separated from each other and individually formed, they have little or negligible influence in determining the location of the neutral plane NP, compared to a single leveler having the equal width (or area) in the horizontal direction. As a result, it is possible to avoid or reduce the addition of an element for adjusting the neutral plane corresponding to the first and second levelers 571 and 572 for adjusting the location of the neutral plane NP.

Although the levelers 271, 272, 571, and 572 are depicted as having the rectangular cross-sectional shape in FIGS. 4 and 5, the present disclosure is not limited thereto.

Figure 6:
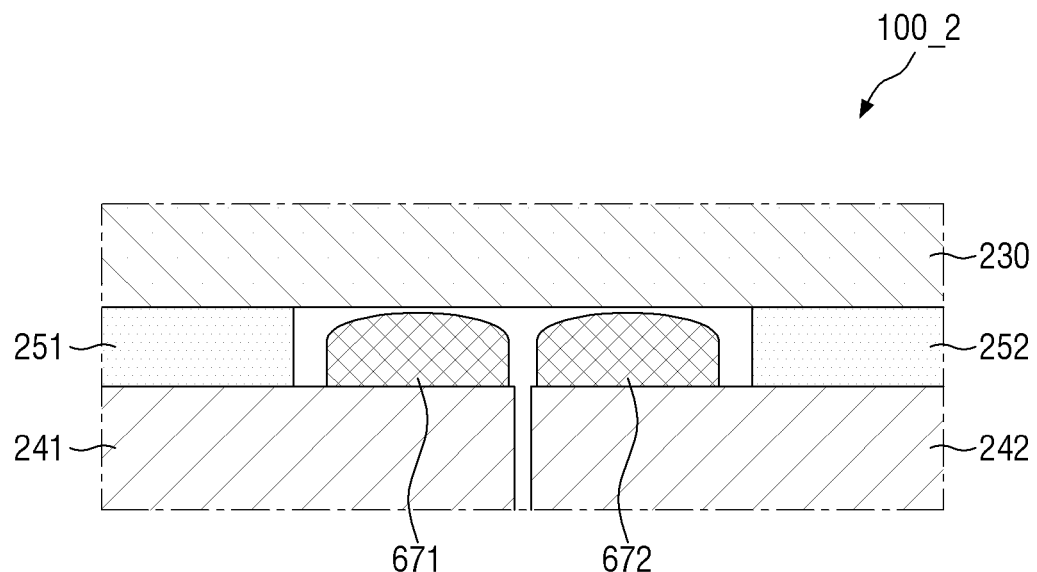
FIGS. 6 and 7 are cross-sectional views of display devices according to various exemplary embodiments of the present disclosure.
Figure 7:
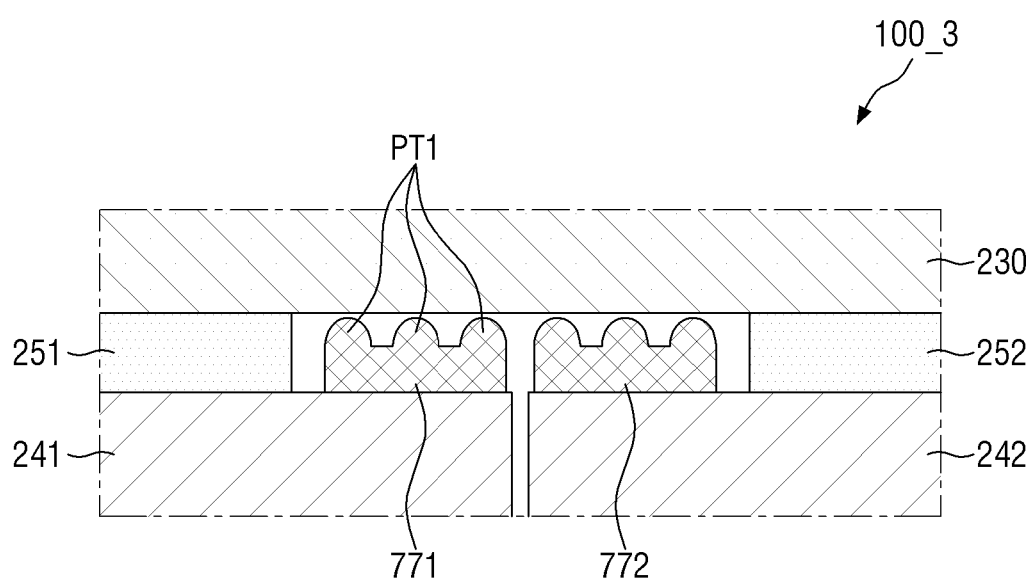

FIGS. 6 and 7 are cross-sectional views of display devices according to various exemplary embodiments of the present disclosure.

Referring to FIG. 6, a display device 100_2 is different from the display device 100 of FIG. 2 in that the display device 100_2 includes first and second levelers 671 and 672. The first and second levelers 671 and 672 may be substantially the same as the first and second levelers 271 and 272, respectively, except for a cross-sectional shape. Therefore, descriptions of the same elements will be omitted to avoid redundancy. FIG. 6 is an enlarged view of a region corresponding to region "AA" of FIG. 2. Although not shown in FIG. 6, the display device 100_2 may include a display panel 210, an upper flexible module 220, etc.

The first leveler 671 may be disposed between the first rigid plate 241 and the lower flexible module 230 in the foldable region FR and may be coupled with the first rigid plate 241 by the adhesive portion ADP thereunder.

An average thickness of the first leveler 671 may be less than a thickness of the first and second coupling films 251 and 252. As shown in FIG. 6, an upper surface of the first leveler 671 may have a cross-sectional shape of an arc or a semicircle whose center protrudes upward. When no additional external force is applied to the display device 100_2, an area in which the upper surface of the first leveler 671 comes in contact with the lower flexible module 230 is relatively reduced. Accordingly, it is also possible to prevent or substantially prevent unnecessary force from being applied to the lower flexible module 230 (and the display panel 210) from the bottom (e.g., a force exceeding a required supporting force for preventing sagging of the lower flexible module 230). When an external force is applied to the display device 100_2 from the top, the area in which the upper surface of the first leveler 671 comes in contact with the lower flexible module 230 is increased, such that the deformation of the lower flexible module 230 (and the display panel 210) can be prevented or substantially prevented due to the external force.

The average thickness of the first leveler 671 may become larger as the width W1 of the foldable region FR becomes larger. For example, as the width W1 of the foldable region FR becomes larger, a thickness of the edge of the first leveler 671 may become larger or a curvature radius of the upper surface may increase. Similarly, as the thickness of the first and second coupling films 252 and 252 becomes larger, the average thickness of the first leveler 671 may increase. For example, as the thickness of the first and second coupling films 252 and 252 becomes larger, the thickness of the edge of the first leveler 671 may become larger or the curvature radius of the upper surface may increase.

The second leveler 672 may be disposed between the second rigid plate 242 and the lower flexible module 230 in the foldable region FR and may be coupled with the second rigid plate 242 by the adhesive portion ADP thereunder. The second leveler 672 may be substantially the same as the first leveler 671.

Although the upper surface of each of the first and second levelers 671 and 672 is depicted as being an arc protruding upward in FIG. 6, the present disclosure is not limited thereto. For example, the first and second levelers 671 and 672 may have a cross-sectional shape such as any of a triangular, trapezoidal, and a polygonal shape having a partially different thickness. As another example, the first and second levelers 671 and 672 may have a cross-sectional shape in which the center is recessed.

Referring to FIG. 7, a display device 100_3 is different from the display device 100_2 of FIG. 6 (or the display device 100 of FIG. 2) in that the display device 1003 includes first and second levelers 771 and 772. The first and second levelers 771 and 772 may be substantially the same as the first and second levelers 671 and 672 (or the first and second levelers 271 and 272), respectively, except for a cross-sectional shape.

An average thickness of the first leveler 771 may be less than the thickness of the first and second coupling films 251 and 252. As shown in FIG. 7, the upper surface of the first leveler 771 may include protrusions (or projections) PT1. For example, the first leveler 771 may include, but is not limited to, three protrusions PT1 in the horizontal direction. For example, the first leveler 771 may include two or four or more protrusions PT1 in the horizontal direction.

In an embodiment, due to the three protrusions PT1 of the first leveler 771, it is possible to prevent or substantially prevent the supporting force from being concentrated at a particular point of the lower flexible module 230 (or the display panel 210). That is, the supporting force with respect to the lower flexible module 230 (or the display panel 210) can be evenly distributed throughout the foldable region FR.

The second leveler 772 may be disposed between the second rigid plate 242 and the lower flexible module 230 in the foldable region FR and may be coupled with the second rigid plate 242 by the adhesive portion ADP thereunder. The second leveler 772 may be substantially the same as the first leveler 771.

Figure 8:
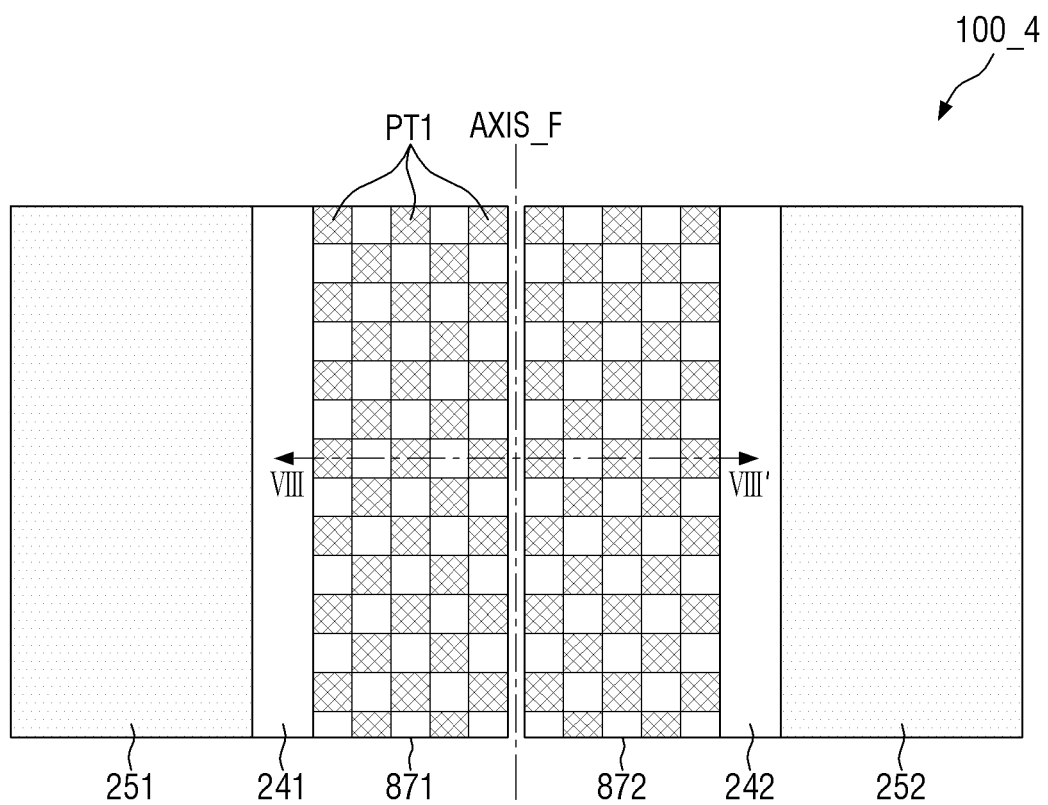
FIGS. 8 to 10 are plan views of display devices according to various exemplary embodiments of the present disclosure.
Figure 9:
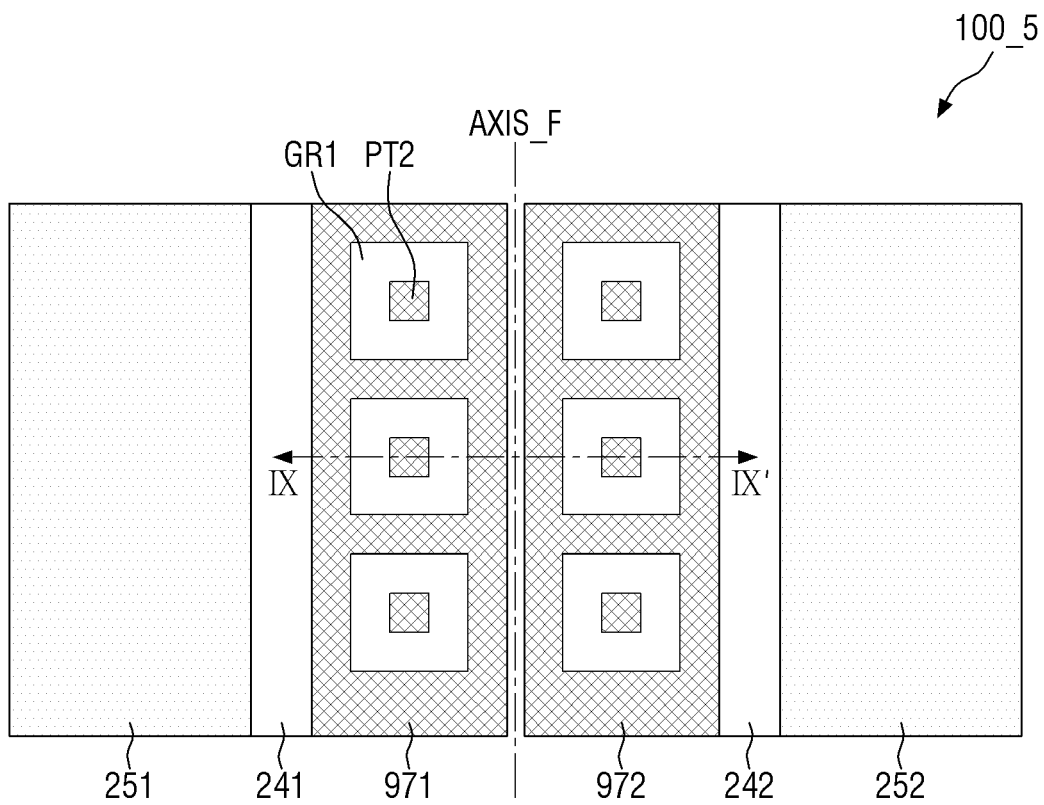
Figure 10:
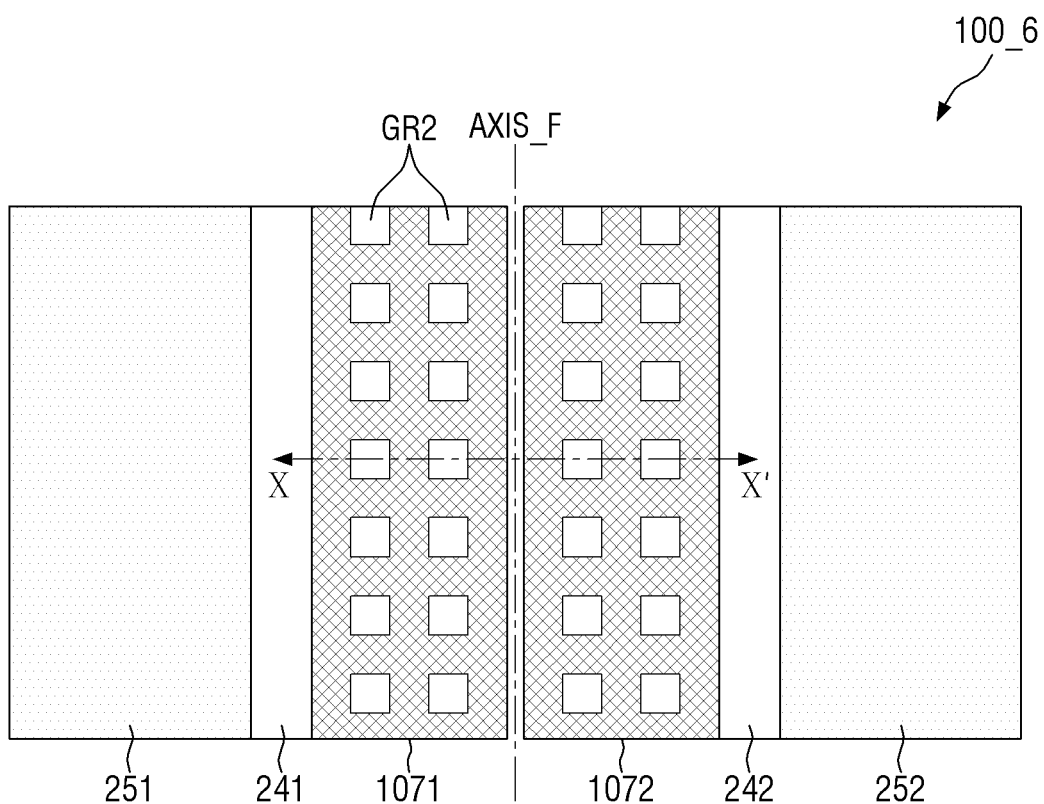

FIGS. 8 to 10 are plan views of display devices according to various exemplary embodiments of the present disclosure.

Referring to FIG. 8, a display device 100_4 is different from the display device 100 of FIG. 2 in that the display device 100_4 includes first and second levelers 871 and 872 each having a pattern.

FIG. 8 is a plan view of a region corresponding to the region "AA" of FIG. 2 (or a view showing a part thereof). Although not shown in FIG. 8, the display device 100_4 may include a display panel 210, an upper flexible module 220, etc.

In an embodiment, the first leveler 871 may have a rectangular shape and may overlap with the first rigid plate 241 such that it is spaced apart from the first coupling film 251.

The first leveler 871 may include first protrusions PT1 similarly to the first leveler 771. The first protrusions PT1 may have, but are not limited to, a rectangular shape when viewed from the top. For example, the first protrusions PT1 may have a shape such as any of a circle, a triangle, and a polygon when viewed from the top. The protrusions PT1 may be repeatedly arranged at an interval (e.g., a predetermined interval) in the horizontal direction and repeatedly arranged at an interval (e.g., a predetermined interval) in the vertical direction. However, it is noted that the arrangement of the first protrusions PT1 is not limited thereto.

That is, the protrusions PT1 may be arranged in a lattice on the upper surface of the first leveler 871, such that the first leveler 871 may have a lattice pattern on the upper surface.

In an embodiment, when the display device 100_4 is cut along the line VIII-VIII', the display device 100_4 may have the same cross-section as the cross-section shown in FIG. 7. It is, however, to be understood that the present disclosure is not limited thereto. One of the first protrusions PT1 may have a thickness different from that of an adjacent protrusion.

Similarly, the second leveler 872 may have a rectangular shape and may overlap with the second rigid plate 242 such that it is spaced apart from the second coupling film 252. The second leveler 872 may be substantially the same as the first leveler 871.

As described above, by using the first and second levelers 871 and 872 including the first protrusions PT1 arranged in a lattice in the plan view, it is possible to distribute the supporting force in the foldable region FR. In addition, as recesses (i.e. recesses corresponding to the first protrusions PT1) are arranged discontinuously in a lattice, the area in which the display panel 210 (or the lower flexible module 230) can be deformed continuously (or unit area) is reduced, thereby effectively preventing or substantially preventing the deformation of the entire display panel 210. Further, when the distance between the first protrusions PT1 is relatively large, the stickiness to the first and second levelers 871 and 872 with respect to the lower flexible module 230 is lowered, such that it is possible to prevent or substantially prevent dust or the like from gathering between the protrusions.

Referring to FIG. 9, a display device 100_5 is different from the display device 100_4 of FIG. 8 in that the display device 100_5 includes first and second levelers 971 and 972. The first and second levelers 971 and 972 may be substantially the same as the first and second levelers 871 and 872 except for a shape of the pattern when viewed from the top.

The first leveler 971 may include a first recess (or a first groove) GR1. The first groove GR1 is a portion recessed downward from the upper surface of the first leveler 971 and may have a thickness smaller than the average thickness of the first leveler 971.

The first groove GR1 is spaced apart from each of the upper and lower edges of the first leveler 971 by a distance (e.g., a predetermined distance) and may have a closed loop when viewed from the top. Further, the first grooves GR1 may be repeatedly arranged in the vertical direction. In an exemplary embodiment, an edge of the first leveler 971 outside the first groove GR1 protrudes, such that a second protrusion PT2 may be formed inside the first groove GR1. Accordingly, the first leveler 971 may have a reduced volume/area and may efficiently support the lower flexible module 230 (or the display panel 210).

The second leveler 972 may be substantially the same as the first leveler 971.

In an embodiment, when the display device 100_5 is cut along the line IX-IX', the display device 100_5 may have a cross-section the same as the cross-section shown in FIG. 7.

Referring to FIG. 10, a display device 100_6 is different from the display device 100_5 of FIG. 9 in that the display device 100_6 includes first and second levelers 1071 and 1072. The first and second levelers 1071 and 1072 may be substantially the same as the first and second levelers 971 and 972 except for a shape of the pattern when viewed from the top.

The first leveler 1071 may have second grooves GR2. The second grooves GR2 are similar to the first grooves GR1 described above with reference to FIG. 9, but may be arranged independently in an island shape. The second grooves GR2 may be repeatedly arranged in the horizontal direction at a spacing (e.g., a predetermined spacing) and may be repeatedly arranged in the vertical direction as well. However, it is noted that the arrangement of the second grooves GR2 is not limited thereto.

The second leveler 1072 may be substantially the same as the first leveler 1071.

Therefore, the first and second levelers 1071 and 1072 (or the display device 100_6) may have a pattern of protrusions that are separated by the second grooves GR2 but are continuous (or interconnected). Therefore, it is possible to prevent or substantially prevent the leveling function from being deteriorated as it is used repeatedly, even with a reduced stickiness.

FIGS. 11 to 14 are cross-sectional views of display devices according to various exemplary embodiments.

Figure 11:
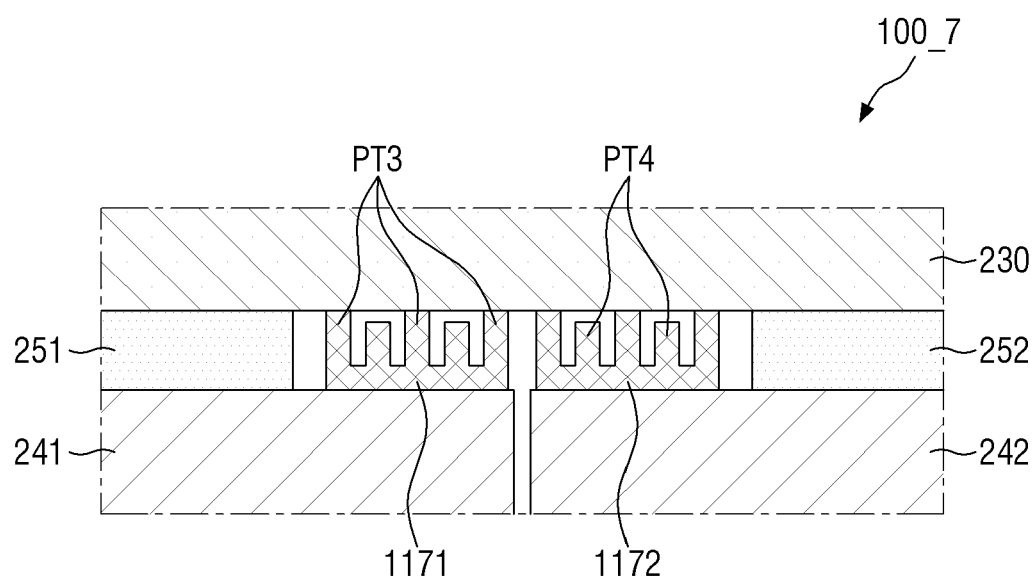
FIGS. 11 to 14 are cross-sectional views of display devices according to various exemplary embodiments of the present disclosure.

Referring to FIG. 11, a display device 100_7 is different from the display device 100_2 of FIG. 6 (or the display device 100 of FIG. 2) in that the display device 1007 includes first and second levelers 1171 and 1172. The first and second levelers 1171 and 1172 may be substantially the same as the first and second levelers 671 and 672 (or the first and second levelers 271 and 272), respectively, except for a cross-sectional shape.

The first leveler 1171 may include third protrusions PT3 and fourth protrusions PT4. The third protrusions PT3 may have a thickness equal to or similar to the thickness of the first coupling film 251. The fourth protrusions PT4 are disposed adjacent to the third protrusions PT3 and may have a thickness smaller than the thickness of the third protrusions PT3.

In an embodiment, the first leveler 1171 primarily supports the lower flexible module 230 by the third protrusions PT3 and secondarily supports the lower flexible module 230 by the fourth protrusions PT4, such that it is possible to prevent or substantially prevent the deformation of the display panel 210. Further, by alternately arranging the third protrusions PT3 and the fourth protrusions PT4, the supporting force of the first leveler 1171 can be distributed throughout the entire foldable region FR. Further, as the third protrusions PT3 and the fourth protrusions PT4 are arranged such that they are spaced apart from one another, it is possible to reduce an influence by foreign materials that may be located between the first leveler 1171 and the lower flexible module 230.

The second leveler 1172 may be substantially the same as the first leveler 1171.

Figure 12:
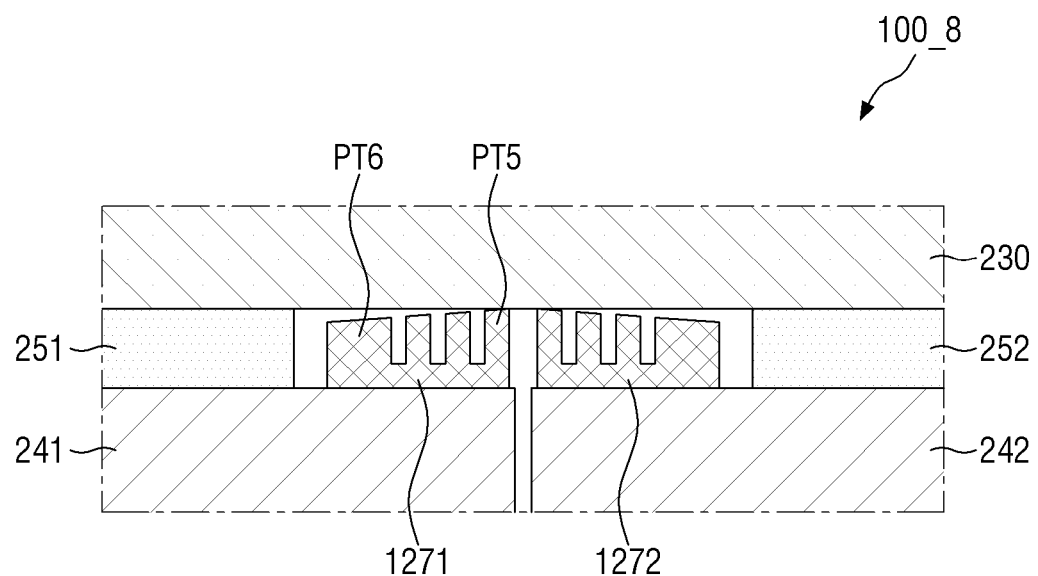

Referring to FIG. 12, a display device 100_8 is different from the display device 100_7 of FIG. 11 in that the display device 100_8 includes first and second levelers 1271 and 1272.

The thickness of the first leveler 1271 may become smaller toward the first coupling film 251 or may become larger toward the folding line FL (or the folding axis AXIS_F). That is, the first leveler 1271 may have an inclined upper surface with respect to the lower surface of the lower flexible module 230 (or the upper surface of the first rigid plate 241).

Since the lower flexible module 230 (or the display panel 210) is supported by the first and second coupling films 251 and 252 at the edges of the foldable region RF, the lower flexible module 230 may be bent as the portion adjacent to the folding line FL becomes convex downward when an external force is applied from the top. Therefore, the first leveler 1271 gradually supports the lower flexible module 230 from the center of the foldable region FR to the edge of the foldable region FR with respect to the folding line FL. Accordingly, it is possible to more effectively prevent the deformation of the display panel 210 due to an external force.

The first leveler 1271 may include a plurality of protrusions PT5 and PT6. Depending on an overall cross-sectional shape of the first leveler 1271, the thickness (or height) of the protrusions may become larger as they are closer to the folding line FL, and the thickness of the protrusions may become smaller as they are closer to the first coupling film 251. For example, the fifth protrusions PT5 adjacent to the folding line FL may be thicker than the sixth protrusions PT6 adjacent to the first coupling film 251.

In an embodiment, a width (or an area) of the protrusions becomes smaller or the spacing between the protrusions becomes larger as the protrusions are closer to the folding line FL. For example, the width of the fifth protrusions PT5 may be smaller than the width of the sixth protrusions PT6. For another example, the spacing between the fifth protrusions PT5 may be larger than the spacing between the sixth protrusions PT6. However, it is noted that the protrusions PT5 and PT6 are not limited thereto. For example, the width (or the area) may become larger or the spacing between the protrusions may become smaller as they are closer to the folding line FL.

The first leveler 1271 can more effectively prevent deformation of the display panel 210 due to an external force by adjusting the width of each of the convex portions and spacing distance therebetween.

The second leveler 1272 may be symmetrical with the first leveler 1271 with respect to the folding line FL.

Figure 13:
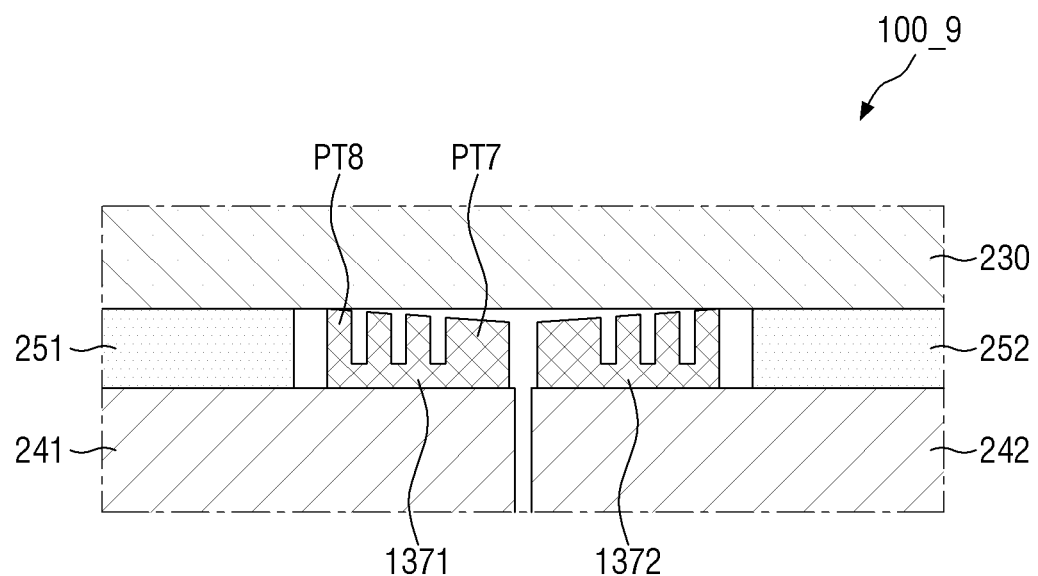

Referring to FIG. 13, a display device 100_9 is different from the display device 100_8 of FIG. 12 in that the display device 100_9 includes first and second levelers 1371 and 1372.

The first leveler 1371 may be substantially the same as the first leveler 1271, except that its left and right sides are reversed. For example, the first leveler 1371 may include seventh and eighth protrusions PT7 and PT8. The seventh protrusions PT7 may be substantially the same as or similar to the sixth protrusions PT6, and the eighth protrusions PT8 may be substantially the same as or similar to the fifth protrusions PT5. Similarly, the second leveler 1372 may be substantially the same as the second leveler 1272, except that its left and right sides are reversed. Therefore, descriptions of the same elements will be omitted to avoid redundancy.

Figure 14:
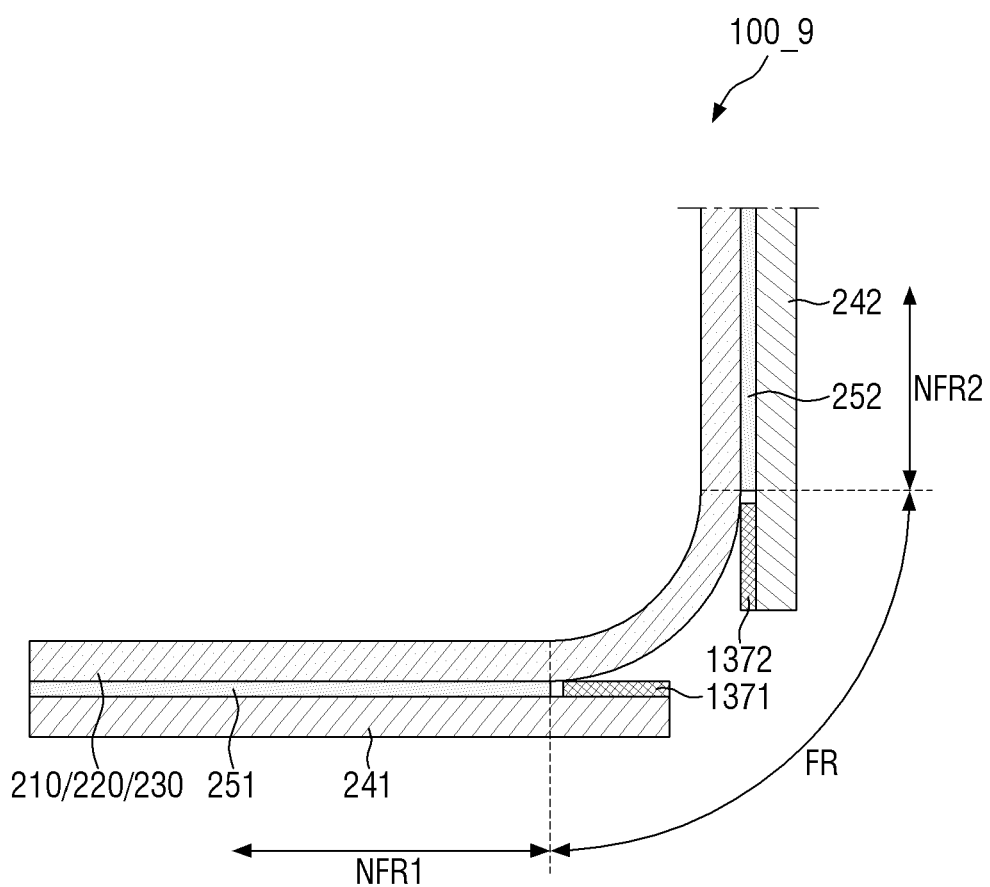

As shown in FIG. 14, in the process of folding or unfolding the display device 100_9, a large stress may be generated at the portion of the lower flexible module 230 (or the display panel 210) where the coupling with the first coupling film 251 is started/ended (i.e. a boundary between the first non-foldable region NFR1 and the foldable region FR). Since the first non-foldable region NFR1 of the lower flexible module 230 is fixed to the housing while the foldable region FR of the lower flexible module 230 is not fixed to the housing, the stress may be relatively large at the boundary where the characteristics of the regions change discontinuously (i.e. the boundary between the first non-foldable region NFR1 and the foldable region FR).

Therefore, the first leveler 1371 can distribute the stress applied to the boundary between the first non-foldable region NFR1 and the foldable region FR of the lower flexible module 230 by the eighth protrusions PT8. In addition, the first leveler 1371 can prevent or substantially prevent unnecessary force from being applied to the lower flexible module 230 from the bottom by the seventh protrusions PT7.

Figure 15:
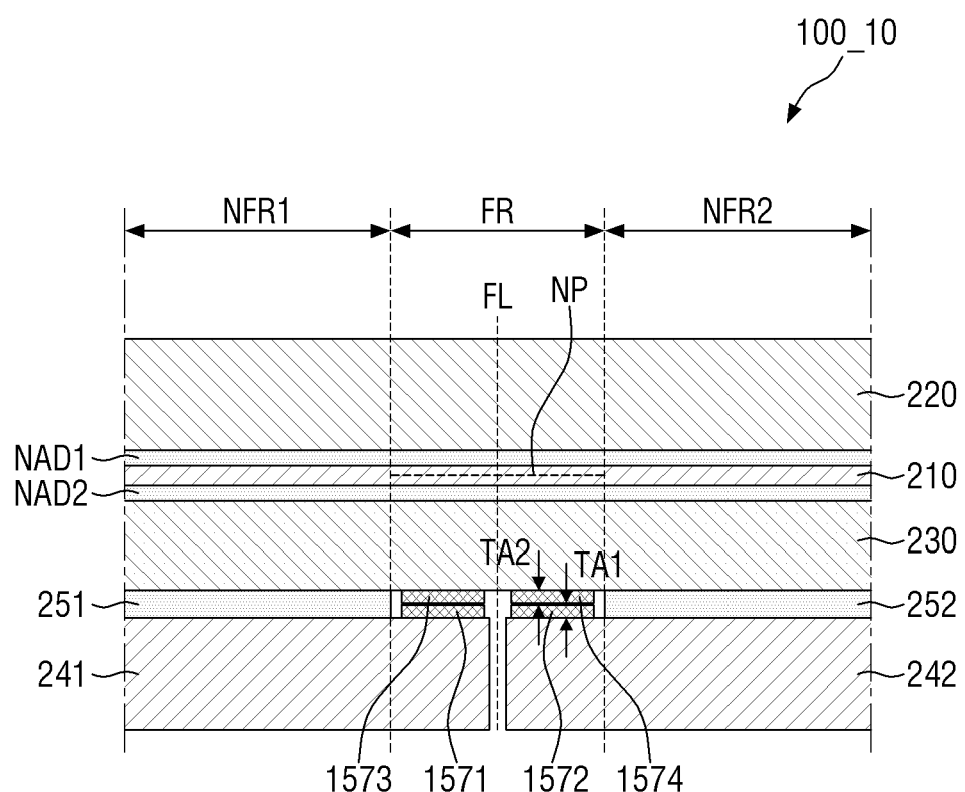
FIGS. 15 and 16 are cross-sectional views of a display device according to another exemplary embodiment of the present disclosure.
Figure 16:
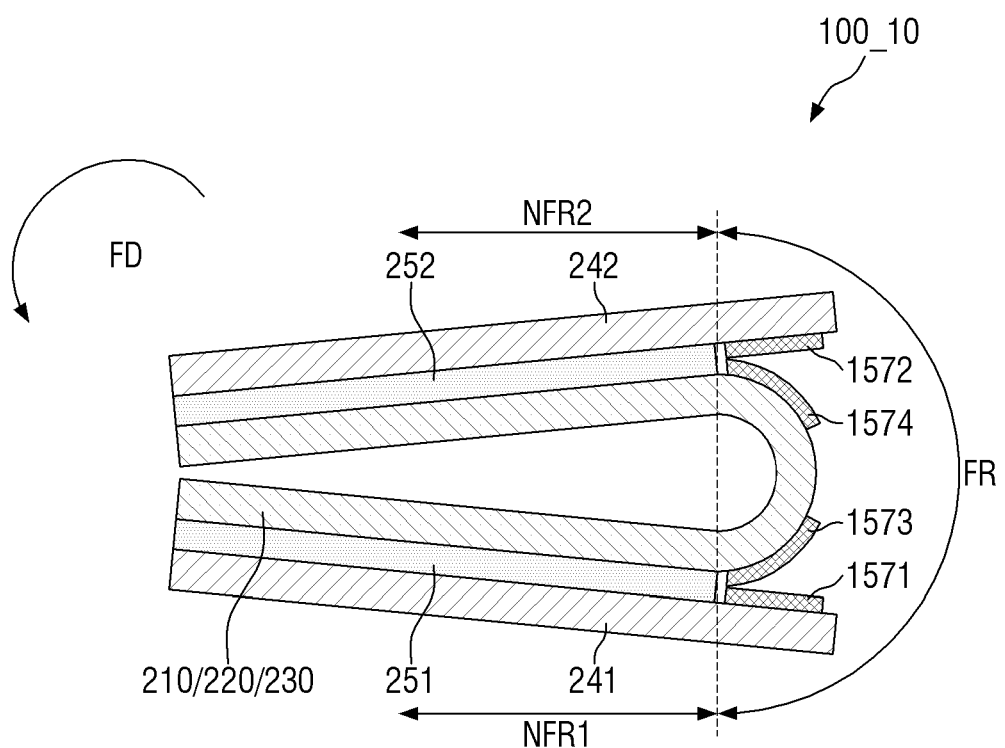

FIGS. 15 and 16 are cross-sectional views of a display device according to another exemplary embodiment of the present disclosure.

Referring to FIGS. 15 and 16, a display device 100_10 is different from the display device 100 of FIG. 2 (and the display device 100_1 of FIG. 5) in that the display device 100_10 includes first to fourth levelers 1571 to 1574.

The first and second levelers (or level difference compensating members) 1571 and 1572 may be substantially the same as or similar to the first and second level compensating members 271 and 272 described above with reference to FIGS. 2 and 4, respectively. The first and second levelers 1571 and 1572 may be attached to the first and second rigid plates 241 and 242 by an adhesive portion ADP thereunder.

The first and second levelers 1573 and 1574 may be substantially the same as or similar to the third and fourth levelers 571 and 572 described above with reference to FIG. 5, respectively. The third and fourth levelers 1573 and 1574 may be attached under the lower flexible module 230 by an adhesive portion ADP thereon.

An overall thickness of the first and third levelers 1571 and 1573 may be equal to or similar to the thickness of the first coupling film 251. Similarly, an overall thickness of the second and fourth levelers 1572 and 1574 may be equal to or similar to the thickness of the second coupling film 552.

In an embodiment, a thickness TA2 of the third and fourth levelers 1573 and 1574 may be less than or equal to a thickness TA1 of the first and second levelers 1571 and 1572. For example, the first and second levelers 1571 and 1572 may be single-sided adhesive films and may be attached to the first and second rigid plates 241 and 242, respectively. The third and fourth levelers 1573 and 1574 may be formed on the lower surface of the lower flexible module 230 in the form of an anti-fouling (AF) coating. As another example, the first and second rigid plates 241 and 242 may be formed by AF coating, while the third and fourth levelers 1573 and 1574 may be single-sided adhesive films.

In the process of unfolding the display device 100_10 in the folded state, it is possible to prevent or substantially prevent the first and second levelers 1571 and 1572 from being caught by the third and fourth levelers 1573 and 1574. In addition, the stickiness between the first and second levelers 1571 and 1572 and the third and fourth levelers 1573 and 1574 may become lower, such that the display device 100_10 can be easily switched from the unfolded state to the folded state.

Figure 17:
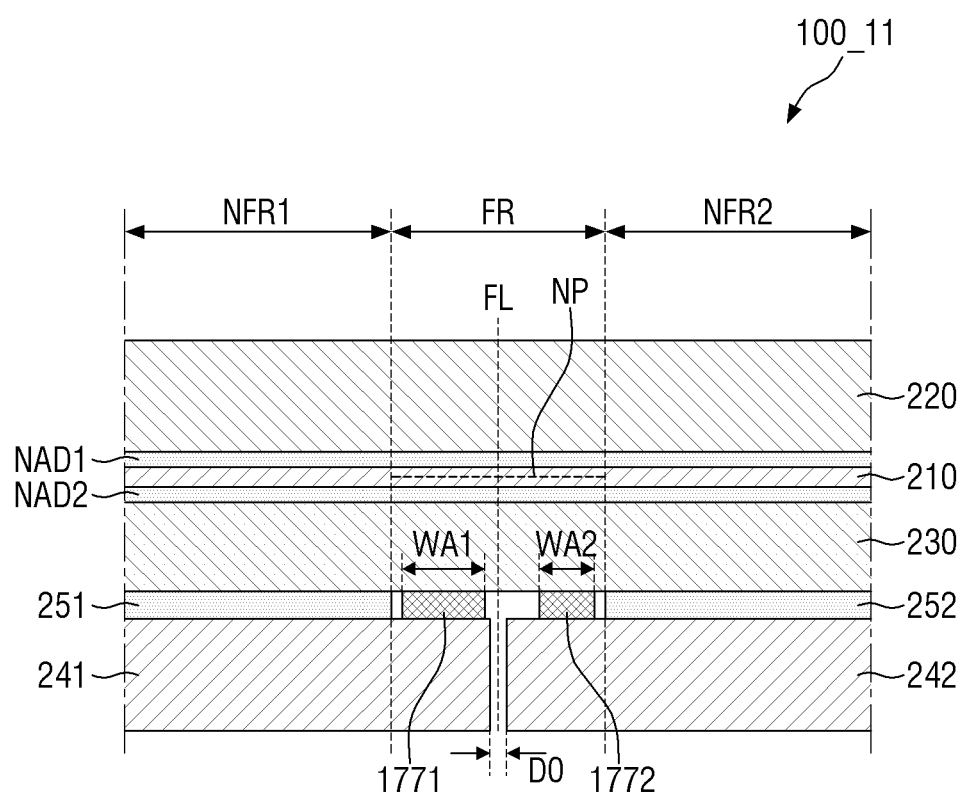
FIG. 17 is a cross-sectional view of a display device according to another exemplary embodiment of the present disclosure.
Figure 18:
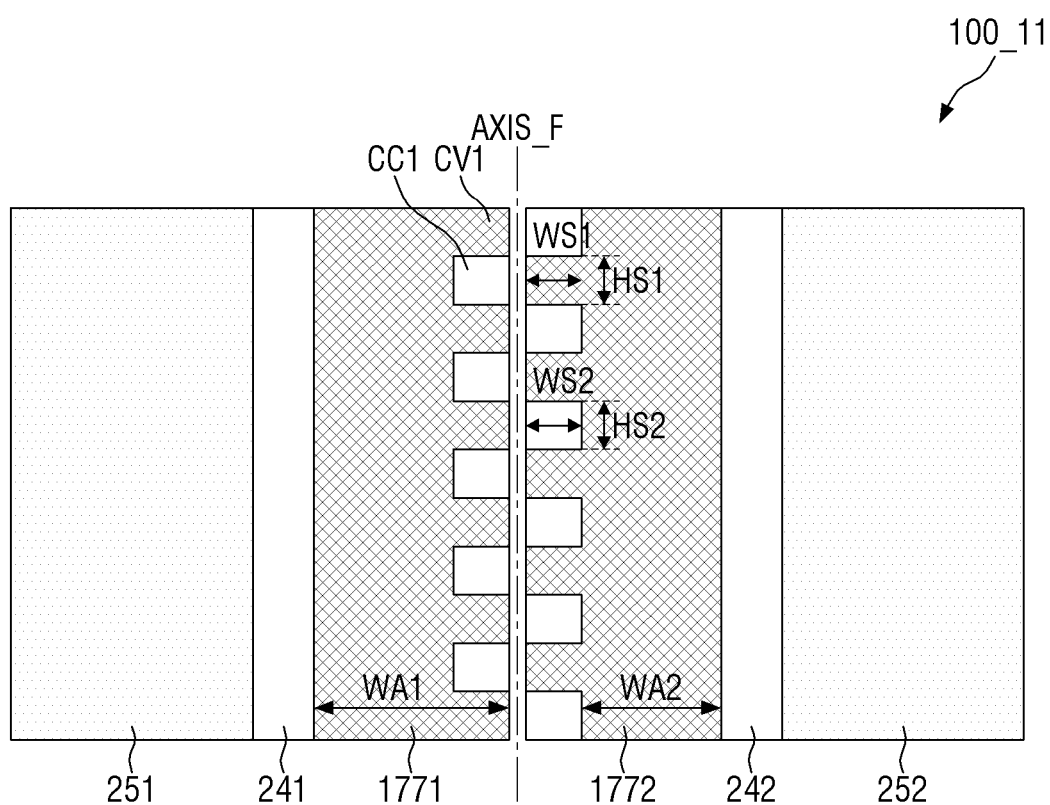
FIG. 18 is a plan view of the display device of FIG. 17.

FIG. 17 is a cross-sectional view of a display device according to another exemplary embodiment of the present disclosure; and FIG. 18 is a plan view of the display device of FIG. 17.

Referring to FIGS. 17 and 18, a display device 100_11 is different from the display device 100 of FIG. 2 in that the display device 100_11 includes first and second levelers 1771 and 1772.

The first and second levelers 1771 and 1772 may be similar to the first and second levelers 271 and 272 of FIG. 2. It is noted that an inner side surface of each of the first and second levelers 1771 and 1772 (i.e. the side surface adjacent to the folding line FL or the inner side surface facing the inner side surface of the other leveler) may include a concave-convex pattern (or an uneven pattern or shape) when viewed from the top.

As shown in FIG. 18, each of the first and second levelers 1771 and 1772 (or concave-convex patterns) may include first convex portions CV1 and first concave portions CC1.

The first convex portion CV1 may have a rectangular shape and may have a first width WS1 in the horizontal direction and a first height HS1 in the vertical direction. The first height HS1 may be larger than or equal to the first width WS1. The first width WS1 may be less than or equal to the reference distance D0 (i.e. the spacing distance between the first and second rigid plates 241 and 242). Similarly, the first concave portion CC1 may have a rectangular shape and may have a second width WS2 in the horizontal direction and a second height HS2 in the vertical direction. The second height HS2 may be larger than or equal to the second width WS2. The second width WS2 may be, but is not limited to being, equal to the first width WS1. Similarly, the second height HS2 may be, but is not limited to being, equal to the first height HS1.

On the inner side surface of the first levelers 1771, the first convex portions CV1 and the first concave portions CC1 may be arranged sequentially and repetitively. Similarly, on the inner side surface of the second levelers 1772, the first convex portions CV1 and the first concave portions CC1 may be arranged sequentially and repetitively. The first concave portions CC1 of the second levelers 1772 may be arranged corresponding to the first convex portions CV1 of the first levelers 1771, respectively. For example, the first concave portions CC1 of the first levelers 1771 may be located on a same line (or on the same plane) in the horizontal direction perpendicular to the folding line FL with the first convex portions CV1 of the second levelers 1772. Similarly, the first convex portions CV1 of the second levelers 1772 may be arranged corresponding to the first concave portions CC1 of the first levelers 1771. In an embodiment, as shown in FIG. 17, a width WA1 of the first levelers 1771 and a width WA2 of the second levelers 1772 and their locations may be different from each other.

As a result, it is possible to prevent or substantially prevent the first and second levelers 1771 and 1772 from overlapping with each other due to thermal expansion or the like, and to reduce the distance between the first and second levelers 1771 and 1772 (i.e. the horizontal spacing distance). In addition, an empty space formed by the first convex portions CV1 and the first concave portions CC1 of the first and second levelers 1771 and 1772 (i.e. a space by which the first and second levelers 1771 and 1772 are spaced apart from each other in the horizontal direction) is formed discontinuously in the vertical direction, such that the area of the display panel 210 (and the lower flexible modules 230) that is concurrently (e.g., simultaneously) pressed or deformed in the vertical direction by the pressure applied in the vertical direction can be reduced. That is, it is possible to prevent or substantially prevent deformation of the display device 100_11 and deterioration of the display quality.

Although the first convex portions CV1 and the first concave portions CC1 are depicted as having a quadrangular shape in FIG. 18 when viewed from the top, the first convex portions CV1 and the first concave portions CC1 are not limited thereto. In an embodiment, for example, each of the first convex portions CV1 and the first concave portions CC1 may have a semicircular shape.

Figure 19:
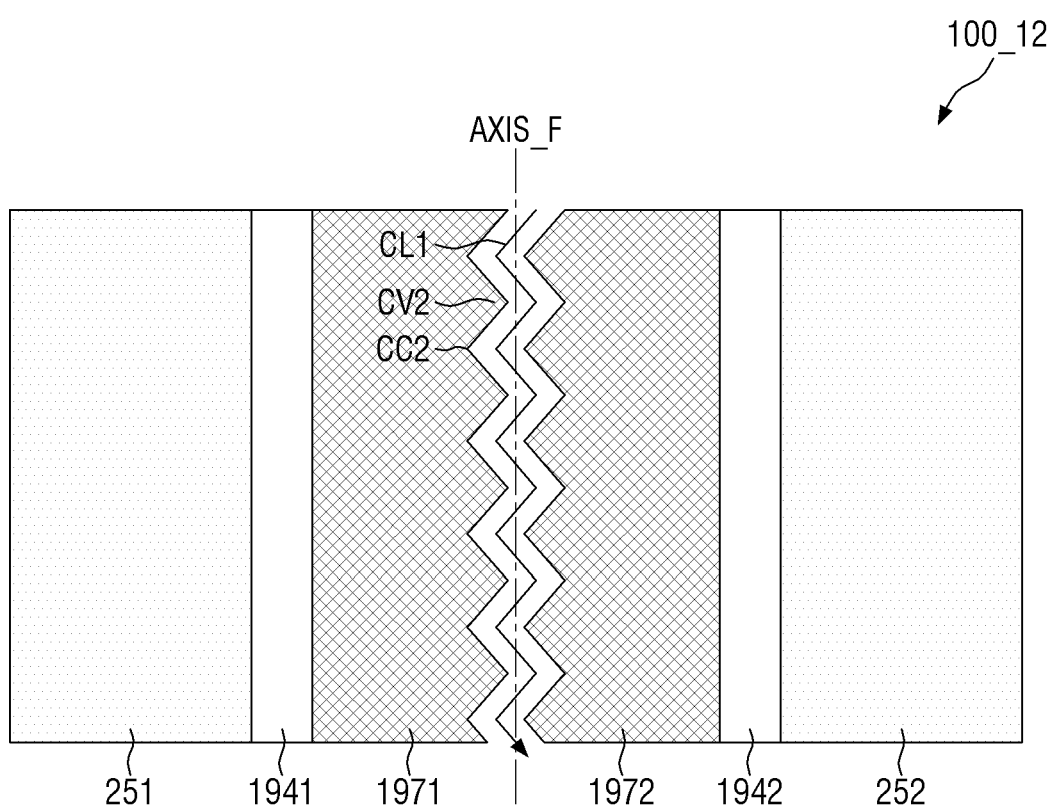
FIGS. 19 to 21 are plan views of display devices according to various exemplary embodiments of the present disclosure.
Figure 20:
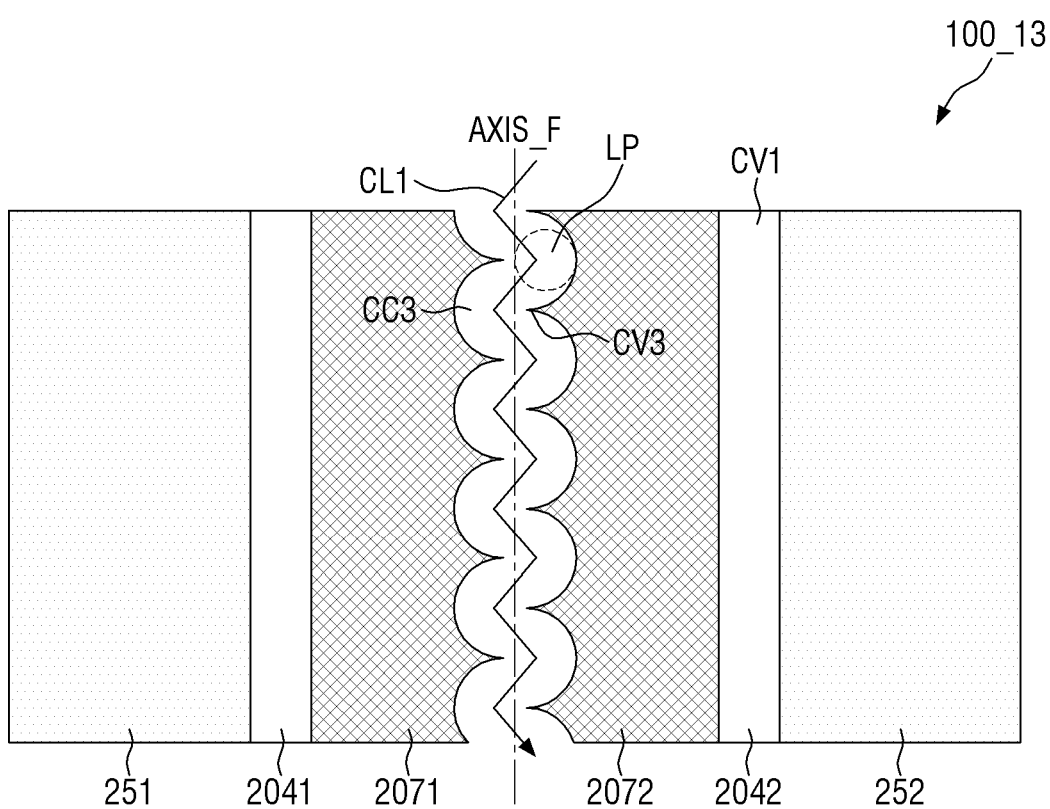
Figure 21:
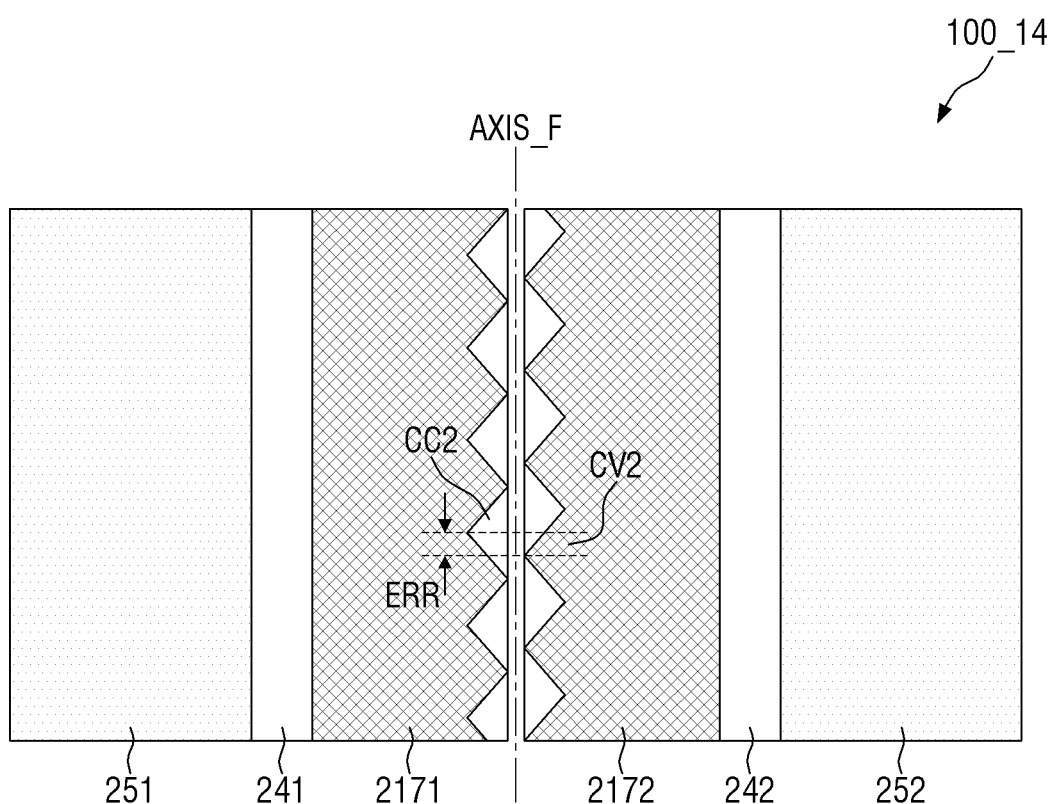

FIGS. 19 to 21 are plan views of display devices according to various exemplary embodiments of the present disclosure.

Referring to FIG. 19, a display device 100_12 is different from the display device 100_11 of FIG. 18 in that the display device 100_12 includes first and second levelers 1971 and 1972 and third and fourth rigid plates 1941 and 1942.

The inner side surface of the first and second levelers 1971 and 1972 (i.e. the side surface adjacent to the folding line FL or the inner side surface facing the inner side surface of the other leveler) may include a concave-convex pattern (or a pattern shape) that is not vertical when viewed from the top, similarly to the first and second levelers 1771 and 1772 described above with reference to FIG. 18. The concave-convex pattern may include second convex portions CV2 and second concave portions CC2.

In an embodiment, each of the second convex portions CV2 and the second concave portions CC2 may have a triangular shape. For example, the second convex portions CV2 (or the second concave portions CC2) may have an isosceles triangle shape. As another example, an angle formed by the shorter sides of each of the second convex portions CV2 (or the second concave portions CC2) may be a right angle.

The size of the second convex portions CV2 may be substantially equal to or similar to the size of the first convex portions CV1 described above with reference to FIG. 18. The size of the second concave portions CC2 may be substantially equal to or similar to the size of the first concave portions CC1 described above with reference to FIG. 18. Therefore, further descriptions of the same elements will be omitted to avoid redundancy.

The second convex portions CV2 and the second concave portions CC2 may be arranged sequentially and repeatedly on the inner side surface of the first leveler 1971 in the vertical direction. Similarly, the second convex portions CV2 and the second concave portions CC2 may be arranged sequentially and repeatedly on the inner side surface of the second leveler 1972 in the vertical direction. The second concave portions CC2 of the second leveler 1972 may be disposed corresponding to the second convex portions CV2 of the first leveler 1971, and the second convex portions CV2 of the second leveler 1972 may be disposed corresponding to the second concave portions CC2 of the first leveler 1971.

In an embodiment, the same pattern as the concave-convex pattern of the first leveler 1971 may be formed on the inner side surface of the third rigid plate 1941. The second convex portions CV2 of the third rigid plate 1941 may be located at the same point as the second convex portions CV2 of the first leveler 1971 when viewed from the top. That is, the second convex portions CV2 of the third rigid plate 1941 may overlap with the second convex portions CV2 of the first leveler 1971 in the thickness direction. Similarly, the same pattern as the concave-convex pattern of the second leveler 1972 may be formed on the inner side surface of the fourth rigid plate 1942.

In an embodiment, a base leveler (not shown) (i.e. an element in which first and second levelers 1971 and 1972 are integrally formed) is attached on a base plate (not shown) in which the third and fourth rigid plates 1941 and 1942 are integrally formed. The base plate in which the base leveling member is laminated is cut along a first cutting line CL1 (or a cutting path), such that the third rigid plate 1941 having the first leveler 1971 attached thereto and the fourth rigid plate 1942 having the second leveler 1972 attached thereto may be produced concurrently (e.g., simultaneously). Therefore, an operation for aligning the levelers having a pattern can be eliminated, such that the process of fabricating the display device 100_12 can be simplified.

Referring to FIG. 20, a display device 100_13 is different from the display device 100_12 of FIG. 19 in that the display device 100_12 includes first and second levelers 2071 and 2072 and fifth and sixth rigid plates 2041 and 2042.

The first and second levelers 2071 and 2072 and the fifth and sixth rigid plates 2041 and 2042 may be substantially the same as the first and second levelers 1971 and 1972 and third and fourth rigid plates 1941 and 1942, respectively, except for a concave-convex pattern shape. Therefore, further descriptions of the same elements will be omitted to avoid redundancy.

The first and second levelers 2071 and 2072 and the fifth and sixth rigid plates 2041 and 2042 may include third concave portions CC3 and third convex portions CV3. Each of the third concave portions CC3 may have an arc shape. The third convex portions CV3 may have a shape different from that of the third concave portions CC3 and may have a triangular or substantially triangular shape.

In an embodiment, for example, when the base plate (and the base leveler) is cut along the first cutting line CL1 by using a laser, the third concave portions CC3 may have a partially arc shape, and the third convex portions CV3 may have a triangular or substantially triangular shape depending on the shape of a laser point LP and the direction in which the laser point LP moves.

Referring to FIG. 21, a display device 100_14 is different from the display device 100_12 of FIG. 19 in that the display device 100_14 includes first and second levelers 2171 and 2172 and first and second rigid plates 251 and 252.

The first and second levelers 2171 and 2172 may be substantially the same as the first and second levelers 1971 and 1972 of FIG. 19, respectively, except for an arrangement therebetween. Therefore, repeated descriptions of the same elements will be omitted to avoid redundancy.

The second concave portions CC2 of the first leveler 2171 may be arranged such that they deviate from the second convex portions CV2 of the second leveler 2172 by an error distance ERR in the vertical direction. For example, a deepest point of the second concave portion CC2 of the first leveler 2171 may be located above a sharpest point of the second convex portion CV2 of the second leveler 2172 by the error distance ERR. It is noted that the error distance ERR may be ½ or less of a length of the second concave portion CC2 in the vertical direction.

In an embodiment, a void formed by an inner side surface of the first leveler 2171 and an inner side surface of the second leveler 2172 (i.e. a space by which the first and second levelers 2171 and 2172 are spaced apart from each other in the horizontal direction) may be formed discontinuously in the vertical direction. As a result, it is possible to prevent or substantially prevent deformation of the display device 100_14 and deterioration of the display quality.

It is noted that the display device 100_14 may include the third and fourth rigid plates 1941 and 1942 described above with reference to FIG. 19 instead of the first and second rigid plates 241 and 242.

In addition, although the first and second levelers 2171 and 2172 are depicted as having second concave portions CC2 in a triangular shape in FIG. 21, this is merely illustrative. For example, the first and second levelers 2171 and 2172 may include recesses (and/or protrusions) having a shape of a circle, square, etc. on the inner side surface when viewed from the top.

Figure 22:
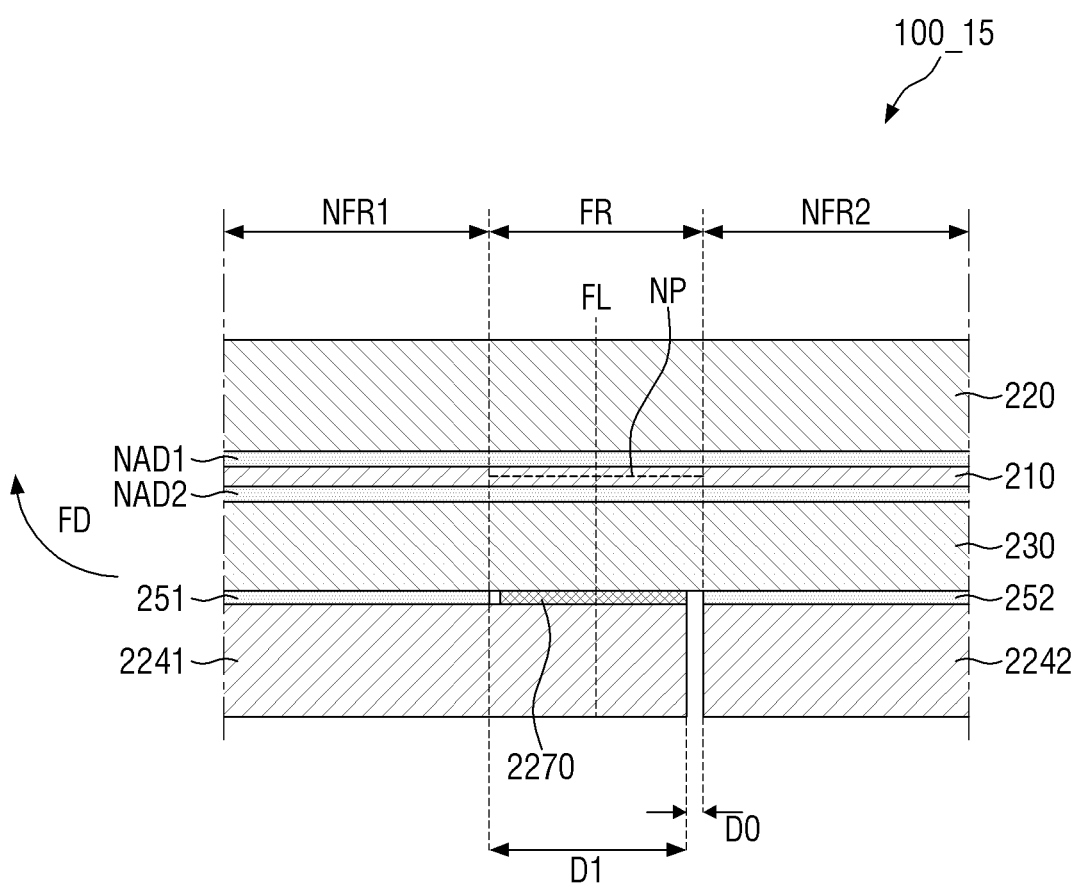
FIGS. 22 and 23 are cross-sectional views of a display device according to another exemplary embodiment of the present disclosure.
Figure 23:
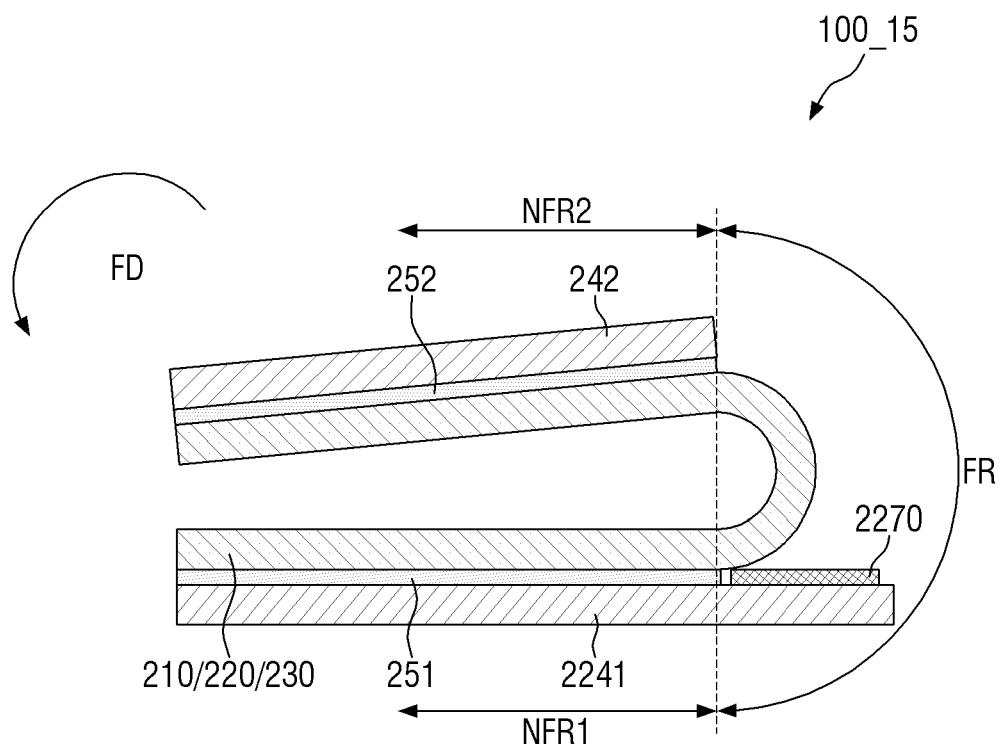

FIGS. 22 and 23 are cross-sectional views of a display device according to another exemplary embodiment of the present disclosure.

Referring to FIGS. 22 and 23, a display device 100_15 is different from the display devices described above, such as the display device 100_4, in that the display device 100_15 includes seventh and eighth rigid plates 2241 and 2242 and a first leveler 2270.

The seventh and eighth rigid plates 2241 and 2242 may be located on the same plane and may be spaced apart from each other by the reference distance D0 in the horizontal direction.

The seventh rigid plate 2241 may overlap with the first non-foldable region NFR1 and the foldable region FR of the display panel 210 in the thickness direction and may be attached to the lower flexible module 230 by the first coupling film 251. The eighth rigid plate 2242 may overlap with the second non-foldable region NFR2 of the display panel 210 in the thickness direction and may be attached to the lower flexible module 230 by the second coupling film 252. The eighth rigid plate 2242 may not overlap with the foldable region FR of the display panel 210 in the thickness direction.

The first leveler 2270 may overlap with the seventh rigid plate 2241 in the thickness direction and may be disposed between the lower flexible module 230 and the seventh rigid plate 2241. The first leveler 2270 may be a single-sided adhesive film which is attached on the seventh rigid plate 2241 by an adhesive portion ADP provided thereunder and has an adhesive lower surface.

The process of fabricating the display device 100-15 including the fabrication, alignment, attachment, etc. of the first leveler 2270 can be simplified.

Although some exemplary embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A display device comprising:
a display panel comprising first and second regions and a middle region between the first and second regions;
a first rigid plate overlapping with the first region of the display panel;
a second rigid plate overlapping with the second region of the display panel;
a first adhesive layer arranged between the display panel and the first rigid plate and adhered with the first rigid plate and the first region of the display panel;
a second adhesive layer arranged between the display panel and the second rigid plate and adhered with the second rigid plate and the second region of the display panel; and
a first leveler between the middle region of the display panel and the first rigid plate and attached to the first rigid plate.

2. The display device of claim 1, further comprising:
a second leveler between the middle region of the display panel and the second rigid plate and attached to the second rigid plate,
wherein the first leveler and the second leveler are spaced apart from the display panel when the middle region of the display panel is bent.

3. A display device comprising:
a display panel comprising first and second regions and a middle region between the first and second regions;
a first rigid plate overlapping with the first region of the display panel;
a second rigid plate overlapping with the second region of the display panel;
a first coupling layer arranged between the display panel and the first rigid plate to be coupled with the first rigid plate and the first region of the display panel;
a second coupling layer arranged between the display panel and the second rigid plate to be coupled with the second rigid plate and the second region of the display panel;
a first leveler between the middle region of the display panel and the first rigid plate and attached to the first rigid plate; and
a second leveler between the middle region of the display panel and the second rigid plate and attached to the second rigid plate,
wherein the first leveler and the second leveler are spaced apart from the display panel when the middle region of the display panel is bent,
wherein each of the first and second levelers comprises a first concave portion and a first convex portion on an inner side surface therebetween,
wherein a first width from a reference plane to the first concave portion is larger than a second width from the reference plane to the first convex portion, and
wherein the reference plane separates the first and second rigid plates from each other.

4. The display device of claim 3, wherein the first convex portion of the first leveler is arranged corresponding to the first concave portion of the second leveler, and
wherein a distance between the first leveler and the second leveler is uniform throughout the entire inner side surface of the first leveler.

5. The display device of claim 3, wherein each of the first and second rigid plates comprises a second concave portion and a second convex portion on an inner side surface therebetween, and
wherein the second convex portion of the first rigid plate completely overlaps with the first convex portion of the first leveler.

6. The display device of claim 3, wherein the first convex portion has a shape different from a shape of the first concave portion, and
wherein an edge of the first convex portion is rounded.

7. The display device of claim 3, wherein the first convex portion of the first leveler is arranged corresponding to the first convex portion of the second leveler,
wherein a distance from the first convex portion of the first leveler to the first convex portion of the second leveler is less than an average distance between the first and second levelers, and
wherein a space between the first and second levelers is discontinuous with respect to the reference plane.

8. A display device comprising:
a display panel comprising first and second regions and a middle region between the first and second regions;
a first rigid plate overlapping with the first region of the display panel;
a second rigid plate overlapping with the second region of the display panel;
a first coupling layer arranged between the display panel and the first rigid plate to be coupled with the first rigid plate and the first region of the display panel;
a second coupling layer arranged between the display panel and the second rigid plate to be coupled with the second rigid plate and the second region of the display panel;
a first leveler between the middle region of the display panel and the first rigid plate and attached to the first rigid plate; and
a second leveler between the middle region of the display panel and the second rigid plate and attached to the second rigid plate,
wherein the first leveler and the second leveler are spaced apart from the display panel when the middle region of the display panel is bent,
wherein the display device further comprises:
a third leveler arranged between the middle region of the display panel and the first leveler to be coupled with the middle region of the display panel; and
a fourth leveler arranged between the middle region of the display panel and the second leveler to be coupled with the middle region of the display panel, wherein the third leveler is spaced apart from the first leveler when the middle region of the display panel is bent, and wherein a sum of a thickness of the first leveler and a thickness of the third leveler is equal to a thickness of the first coupling layer.

9. The display device of claim 8, wherein a thickness of the third leveler is less than a thickness of the first leveler, wherein one of the first and third levelers comprises a single-sided adhesive film, and wherein the other one of the first and third levelers comprises an anti-fouling coating layer.

10. A display device comprising:

a display panel comprising first and second regions and a middle region between the first and second regions;

a first rigid plate overlapping with the first region of the display panel;

a second rigid plate overlapping with the second region of the display panel;

a first coupling layer arranged between the display panel and the first rigid plate to be coupled with the first rigid plate and the first region of the display panel;

a second coupling layer arranged between the display panel and the second rigid plate to be coupled with the second rigid plate and the second region of the display panel;

a first leveler between the middle region of the display panel and the first rigid plate and attached to the first rigid plate; and a second leveler between the middle region of the display panel and the second rigid plate and attached to the second rigid plate, wherein the first leveler and the second leveler are spaced apart from the display panel when the middle region of the display panel is bent, wherein an average thickness of the first leveler is less than a thickness of the first coupling layer, and wherein a thickness of a portion of the first leveler is greater than a thickness of another portion of the first leveler.

11. The display device of claim 10, wherein a thickness at a center of the first leveler is greater than a thickness at an edge of the first leveler.

12. The display device of claim 10, wherein a thickness of the first leveler becomes smaller toward the first coupling layer and becomes larger toward the second leveler.

13. The display device of claim 12, wherein the first leveler comprises convex portions protruding toward the display panel, and wherein a width of each of the convex portions becomes smaller toward the first coupling layer and becomes larger toward the second leveler.

14. The display device of claim 12, wherein the first leveler comprises convex portions protruding toward the display panel, and wherein a distance between the convex portions becomes smaller toward the first coupling layer and becomes larger toward the second leveler.

15. The display device of claim 10, wherein a thickness of the first leveler becomes larger toward the first coupling layer and becomes smaller toward the second leveler.

16. A display device comprising:

a display panel comprising first and second regions and a middle region between the first and second regions;

a first rigid plate overlapping with the first region of the display panel;

a second rigid plate overlapping with the second region of the display panel;

a first coupling layer arranged between the display panel and the first rigid plate to be coupled with the first rigid plate and the first region of the display panel;

a second coupling layer arranged between the display panel and the second rigid plate to be coupled with the second rigid plate and the second region of the display panel;

a first leveler between the middle region of the display panel and the first rigid plate and attached to the first rigid plate; and a second leveler between the middle region of the display panel and the second rigid plate and attached to the second rigid plate, wherein the first leveler and the second leveler are spaced apart from the display panel when the middle region of the display panel is bent, wherein the first leveler includes a plurality of protrusions protruding toward the display panel, and wherein the protrusions have a same thickness.

17. The display device of claim 16, wherein the protrusions are arranged in a lattice when viewed from a top.

18. A display device comprising:

a display panel comprising first and second regions and a middle region between the first and second regions;

a first rigid plate overlapping with the first region of the display panel;

a second rigid plate overlapping with the second region of the display panel;

a first coupling layer arranged between the display panel and the first rigid plate to be coupled with the first rigid plate and the first region of the display panel;

a second coupling layer arranged between the display panel and the second rigid plate to be coupled with the second rigid plate and the second region of the display panel; and a first leveler between the middle region of the display panel and the first rigid plate and attached to the first rigid plate, wherein the second rigid plate does not overlap with the middle region of the display panel.

19. A display device comprising:

a display panel comprising first and second regions and a middle region between the first and second regions;

a first rigid plate overlapping with the first region of the display panel;

a second rigid plate overlapping with the second region of the display panel;

a first coupling layer arranged between the display panel and the first rigid plate to be coupled with the first rigid plate and the first region of the display panel;

a second coupling layer arranged between the display panel and the second rigid plate to be coupled with the second rigid plate and the second region of the display panel; and a first leveler between the middle region of the display panel and the first rigid plate and attached to the display panel.

20. The display device of claim 19, further comprising: a second leveler between the middle region of the display panel and the second rigid plate and attached to the display panel.

* * * * *